US012669907B2

(12) United States Patent
Han et al.

(10) Patent No.: US 12,669,907 B2
(45) Date of Patent: *Jun. 30, 2026

(54) ELECTRONIC APPARATUS

(71) Applicant: SAMSUNG DISPLAY CO., LTD.,
Yongin-si (KR)

(72) Inventors: InYoung Han, Hwaseong-si (KR);
Kicheol Kim, Yongin-si (KR); Minjoo Kim, Seongnam-si (KR); Il-Joo Kim, Hwaseong-si (KR); Dongjin Moon, Cheonan-si (KR); Mikyoung Seo, Cheonan-si (KR); Jae Yoon Chang, Hwaseong-si (KR); Yeri Jeong, Suwon-si (KR); Wonjun Choi, Seoul (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/957,325

(22) Filed: Nov. 22, 2024

(65) Prior Publication Data

US 2025/0085823 A1      Mar. 13, 2025

Related U.S. Application Data

(63) Continuation of application No. 18/230,681, filed on Aug. 7, 2023, now Pat. No. 12,153,770, which is a
(Continued)

(30) Foreign Application Priority Data

Dec. 4, 2019      (KR) ........................ 10-2019-0159952

(51) Int. Cl.
G06F 3/044          (2006.01)

(52) U.S. Cl.
CPC .......... *G06F 3/0446* (2019.05); *G06F 3/0448* (2019.05); *G06F 2203/04111* (2013.01)

(58) Field of Classification Search
CPC ................ G06F 3/0446; G06F 3/0448; G06F 2203/04111; G06F 2203/04112; G06F 3/0443; G06F 3/0445; G06F 3/04144
See application file for complete search history.

(56) References Cited

U.S. PATENT DOCUMENTS 9,829,523 B1 * 11/2017 Peterson ............ G01R 27/2605
10,324,575 B2    6/2019 Hwang et al.
(Continued)

FOREIGN PATENT DOCUMENTS

CN          204390220          6/2015
CN          103558936          4/2016
(Continued)

OTHER PUBLICATIONS

Non-Final Office Action dated Oct. 14, 2021, issued to U.S. Appl. No. 17/105,436.
(Continued)

*Primary Examiner* — Amit Chatly
(74) *Attorney, Agent, or Firm* — Womble Bond Dickinson (US) LLP

(57) ABSTRACT

An electronic apparatus includes a display panel and a sensor disposed on the display panel and including a plurality of sensing units disposed on an active area. Each of the sensing units includes a first sensing pattern, second sensing patterns, a bridge pattern, and a plurality of patterns. Among the sensing units, the patterns of the sensing unit making contact with a first boundary portion having a curvature in the active area and a peripheral area include a plurality of
(Continued)

outer patterns, and at least one of the outer patterns is electrically connected to the first sensing pattern or the second sensing patterns.

17 Claims, 14 Drawing Sheets

Related U.S. Application Data continuation of application No. 17/838,245, filed on Jun. 12, 2022, now Pat. No. 11,755,165, which is a continuation of application No. 17/105,436, filed on Nov. 25, 2020, now Pat. No. 11,360,629.

(56)     References Cited

U.S. PATENT DOCUMENTS

| 10,394,403 | B2 * | 8/2019 | Nakamura | G06F 3/04164 |
|---|---|---|---|---|
| 10,644,083 | B2 | 5/2020 | Lee et al. | |
| 11,360,629 | B2 * | 6/2022 | Han | G06F 3/0448 |
| 11,755,165 | B2 * | 9/2023 | Han | G06F 3/0446 |
| | | | | 345/156 |
| 2011/0291982 | A1 * | 12/2011 | Hsieh | G06F 3/0443 |
| | | | | 345/173 |
| 2011/0291983 | A1 | 12/2011 | Yao | |
| 2014/0098057 | A1 * | 4/2014 | Lee | G06F 3/0443 |
| | | | | 345/174 |
| 2014/0174788 | A1 * | 6/2014 | Lin | G06F 3/0446 |
| | | | | 174/126.1 |
| 2015/0062054 | A1 * | 3/2015 | Yun | G06F 3/04164 |
| | | | | 345/174 |
| 2016/0195983 | A1 * | 7/2016 | Miyake | G06F 3/0446 |
| | | | | 345/174 |
| 2016/0291781 | A1 * | 10/2016 | He | G06F 3/0443 |
| 2016/0299610 | A1 * | 10/2016 | Yoon | G06F 3/0412 |
| 2018/0164931 | A1 | 6/2018 | Na et al. | |
| 2018/0224968 | A1 * | 8/2018 | Church | G06F 3/0448 |
| 2018/0348906 | A1 * | 12/2018 | Hwang | G06F 3/0448 |
| 2020/0310595 | A1 * | 10/2020 | Akhavan Fomani | |
| | | | | G06F 3/0444 |
| 2020/0379605 | A1 * | 12/2020 | Zhang | G06F 3/0443 |
| 2021/0096680 | A1 * | 4/2021 | Li | G06F 3/0446 |
| 2021/0286472 | A1 * | 9/2021 | Gong | G06F 3/0448 |

FOREIGN PATENT DOCUMENTS

| CN | 108984046 | A | 12/2018 |
|---|---|---|---|
| CN | 109388292 | A | 2/2019 |
| KR | 10-2012-0103787 | | 9/2012 |
| KR | 10-2018-0131799 | | 12/2018 |
| KR | 10-2018-0134800 | A | 12/2018 |
| KR | 10-2020-0033362 | | 3/2020 |

OTHER PUBLICATIONS

Notice of Allowance dated Feb. 16, 2022, issued to U.S. Appl. No. 17/105,436.

Non-Final Office Action dated Oct. 13, 2022, issued to U.S. Appl. No. 17/838,245.

Final Office Action dated Jan. 18, 2023, issued to U.S. Appl. No. 17/838,245.

Notice of Allowance dated Apr. 26, 2023, issued to U.S. Appl. No. 17/838,245.

* cited by examiner

FIG. 4

ELECTRONIC APPARATUS

CROSS-REFERENCE TO RELATED APPLICATIONS

This application is a continuation of U.S. patent application Ser. No. 18/230,681, filed on Aug. 7, 2023, which is a continuation of U.S. patent application Ser. No. 17/838,245, filed on Jun. 12, 2022, now U.S. Pat. No. 11,755,165, which is a continuation of U.S. patent application Ser. No. 17/105, 436, filed on Nov. 25, 2020, now U.S. Pat. No. 11,360,629, which claims priority from and the benefit of Korean Patent Application No. 10-2019-0159952, filed on Dec. 4, 2019, the entire content of all of which is incorporated herein by reference.

BACKGROUND

Field

Example embodiments of the invention relate generally to an electronic apparatus and, more specifically, to the electronic apparatus that includes a sensor with improved sensitivity.

Discussion of the Background

An electronic apparatus with a touch screen includes an active area activated in response to an electrical signal. The electronic apparatus senses an input applied thereto from the outside through the active area and simultaneously displays various images to provide a user with information. In recent years, as electronic apparatuses having a variety of shapes have been developed, the active area has been implemented in various shapes.

The above information disclosed in this Background section is only for understanding of the background of the inventive concepts, and, therefore, it may contain information that does not constitute prior art.

SUMMARY

One or more example embodiments of the inventive concepts provides an electronic apparatus including a sensor having an improved sensitivity.

Additional features of the inventive concepts will be set forth in the description which follows, and in part will be apparent from the description, or may be learned by practice of the inventive concepts.

According to one or more example embodiments of the invention, an electronic apparatus includes a display panel and a sensor disposed on the display panel, including an active area and a peripheral area, which are defined therein, and including a plurality of sensing units disposed above the active area. Each of the sensing units includes a first sensing pattern including a plurality of branch portions, a plurality of second sensing patterns spaced apart from the first sensing pattern, a bridge pattern connecting the second sensing patterns to each other, and a plurality of patterns spaced apart from at least one of the first sensing pattern and the second sensing patterns. The patterns of a sensing unit make contact with a first boundary portion having a curvature in a boundary of the active area and the peripheral area among the sensing units includes a plurality of outer patterns, and at least one of the outer patterns is electrically connected to the first sensing pattern of the sensing unit or the second sensing patterns of the sensing unit.

According to one or more example embodiments, the outer patterns may include a first outer pattern disposed between the first sensing pattern and the second sensing patterns and a second outer pattern spaced apart from the first sensing pattern with one of the second sensing patterns interposed therebetween.

According to one or more example embodiments, the first outer pattern may be connected to one branch portion of the branch portions, and the second outer pattern may be spaced apart from the one second sensing pattern.

According to one or more example embodiments, the first outer pattern may be connected to one branch portion of the branch portions, and the second outer pattern may be connected to the one second sensing pattern.

According to one or more example embodiments, the first outer pattern may be spaced apart from the first sensing pattern and the second sensing patterns, and the second outer pattern may be connected to the one second sensing pattern.

According to one or more example embodiments, an outer branch portion, which makes contact with the first boundary portion, among the branch portions may have a width greater than a width of another branch portion among the branch portions.

According to one or more example embodiments, the boundary further may include a second boundary portion extending from the first boundary portion, the sensing units include a first sensing unit spaced apart from the boundary, a second sensing unit makes contact with the first boundary portion, and a third sensing unit makes contact with the second boundary portion, the third sensing unit has an area greater than each of an area of the first sensing unit and an area of the second sensing unit, and the area of the first sensing unit may be greater than the area of the second sensing unit.

According to one or more example embodiments, the sensor further may include a line part that includes a first sensing line electrically connected to the first sensing pattern and a second sensing line electrically connected to the second sensing patterns, and the first sensing pattern of the third sensing unit is connected to the first sensing line.

According to one or more example embodiments, the third sensing unit may further include a boundary pattern disposed between the line part and the second sensing patterns.

According to one or more example embodiments, a boundary between the boundary pattern and the second sensing patterns may have a zigzag shape or a straight-line shape.

According to one or more example embodiments, the sensing units may be arranged in a first direction and a second direction crossing the first direction, some branch portions among the branch portions extend in a first cross direction crossing the first direction and the second direction, and the other branch portions among the branch portions may extend in a second cross direction crossing the first cross direction.

According to one or more example embodiments, each of the branch portions may extend in a direction away from the bridge pattern.

According to one or more example embodiments, each of the second sensing patterns surrounds at least two branch portions among the branch portions.

According to one or more example embodiments, the sensing units may be arranged in a first direction and a second direction crossing the first direction, the second sensing patterns of each of two sensing units adjacent to each other in the first direction among the sensing units are electrically connected to each other, and the second sensing patterns of each of two sensing units adjacent to each other in the second direction among the sensing units are spaced apart from each other with some patterns among the patterns interposed therebetween.

According to one or more example embodiments of the invention, an electronic apparatus includes a display panel and a sensor disposed on the display panel, including an active area and a peripheral area, which are define therein, and including a plurality of sensing units disposed on the active area and a line part that includes a plurality of lines disposed on the peripheral area and electrically connected to the sensing units. Each of the sensing units includes a first sensing pattern including a plurality of branch portions, a plurality of second sensing patterns spaced apart from each other with the first sensing pattern interposed therebetween, and a bridge pattern connecting the second sensing patterns to each other. The sensing units include a first sensing unit spaced apart from a boundary of the active area and the peripheral area, a second sensing unit makes contact with a first boundary portion having a curvature in the boundary, and a third sensing unit making contact with a second boundary portion, which is adjacent to the line part, of the boundary. The third sensing unit includes a boundary pattern disposed between the line part and the second sensing patterns.

According to one or more example embodiments, a boundary between the boundary pattern and the second sensing patterns may have a zigzag shape or a straight-line shape.

According to one or more example embodiments, each of the sensing units may further include a plurality of patterns spaced apart from the first sensing pattern and the second sensing patterns, the patterns may include a plurality of outer patterns making contact with the first boundary portion, and at least one of the outer patterns is electrically connected to the first sensing pattern or the second sensing patterns.

According to one or more example embodiments, the outer patterns may include a first outer pattern disposed between the first sensing pattern and the second sensing patterns and a second outer pattern spaced apart from the first sensing pattern with one second sensing pattern among the second sensing patterns interposed therebetween, and at least one of the first outer pattern and the second outer pattern is connected to one branch portion among the branch portions or the one second sensing pattern.

According to one or more example embodiments of the invention, an electronic apparatus includes a display panel and a sensor disposed on the display panel, including an active area and a peripheral area, which are defined therein, and including a first sensing electrode including a plurality of branch portions and a second sensing electrode crossing the first sensing electrode. A width of a branch portion makes contact with a boundary portion having a curvature in a boundary of the active area and the peripheral area among the branch portions is greater than a width of a branch portion spaced apart from the boundary portion among the branch portions.

According to one or more example embodiments of the invention, an electronic apparatus includes a display panel and a sensor disposed on the display panel, including an active area and a peripheral area, which are defined therein, and including a reference sensing unit disposed on the active area and an outer sensing unit. Each of the reference sensing unit and the outer sensing unit includes a first sensing pattern including a plurality of branch portions, a plurality of second sensing patterns spaced apart from the first sensing pattern, a bridge pattern connecting the second sensing patterns to each other, and a plurality of patterns spaced apart from at least one of the first sensing pattern and the second sensing patterns. The outer sensing unit is disposed adjacent to a boundary portion having a curvature in a boundary of the active area and the peripheral area, and at least one of the patterns of the outer sensing unit is electrically connected to the first sensing pattern or the second sensing patterns.

According to the above, the first to third sensing units of the sensor may have different areas from each other. Thus, the mutual capacitances of the second and third sensing units may be controlled by adjusting the patterns in the second and third sensing units. Accordingly, the sensor that provides uniform sensitivity in the active area may be implemented.

As at least some portions of the outer patterns of the second sensing unit having the relatively small area are electrically connected to the first sensing pattern or the second sensing pattern, the mutual capacitance of the second sensing unit, which is reduced by the difference in area between the first sensing unit and the second sensing unit, may be compensated.

The third sensing unit having the relatively large area further includes the boundary pattern, and the mutual capacitance of the third sensing unit, which is increased by the difference in area between the first sensing unit and the third sensing unit, may be reduced. In addition, a parasitic capacitance generated between the second sensing pattern of the third sensing unit and the sensing lines disposed in the peripheral area may be reduced by the boundary pattern.

It is to be understood that both the foregoing general description and the following detailed description are example and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate example embodiments of the invention, and together with the description serve to explain the inventive concepts.

FIG. 4 is a cross-sectional view showing a display panel according to an embodiment of the inventive concepts.

DETAILED DESCRIPTION

Figure 1:
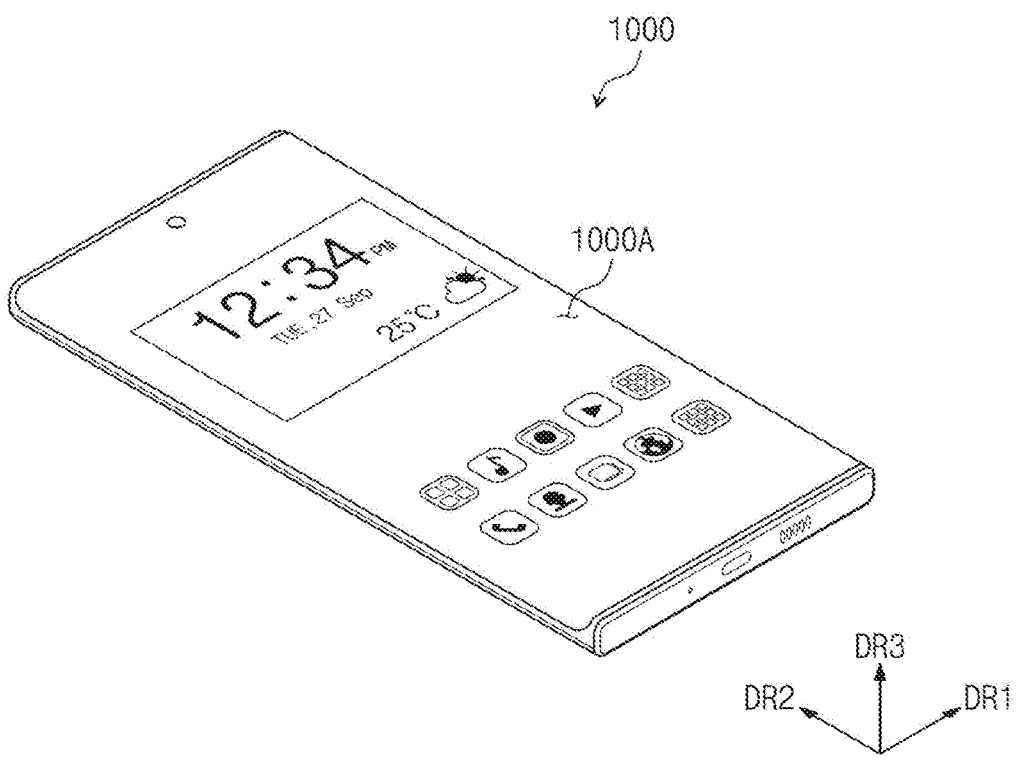
FIG. 1 is a perspective view showing an electronic apparatus according to an embodiment of the inventive concepts.

In the following description, for the purposes of explanation, numerous specific details are set forth in order to provide a thorough understanding of various example embodiments. It is apparent, however, that various example embodiments may be practiced without these specific details or with one or more equivalent arrangements. In the accompanying figures, the size and relative sizes of layers, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms first, second, etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the inventive concepts.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the example term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Various example embodiments are described herein with reference to sectional and/or exploded illustrations that are schematic illustrations of idealized example embodiments and/or intermediate structures. As such, variations from the shapes of the illustrations as a result, for example, of manufacturing techniques and/or tolerances, are to be expected. Thus, example embodiments disclosed herein should not necessarily be construed as limited to the particular illustrated shapes of regions, but are to include deviations in shapes that result from, for instance, manufacturing. In this manner, regions illustrated in the drawings may be schematic in nature and the shapes of these regions may not reflect actual shapes of regions of a device and, as such, are not necessarily intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

FIG. 1 is a perspective view showing an electronic apparatus 1000 according to an embodiment of the inventive concepts.

In FIG. 1, the electronic apparatus 1000 may be an apparatus activated in response to an electrical signal. The electronic apparatus 1000 may be a mobile phone, a tablet computer, a car navigation unit, a game unit, or a wearable unit; however, it should not be limited thereto or thereby. In FIG. 1, a mobile phone will be described as a representative example of the electronic apparatus 1000.

The electronic apparatus 1000 displays an image through an active area 1000A. The active area 1000A may include a flat surface defined by a first direction DR1 and a second direction DR2. The active area 1000A may further include curved surfaces bent from at least two sides of the flat surface. However, the shape of the active area 1000A should not be limited thereto or thereby. For example, the active area 1000A may include only the flat surface, and the active area 1000A may further include four curved surfaces respectively bent from at least two sides, for example, four sides, of the flat surface.

A thickness direction of the electronic apparatus 1000 may be substantially parallel to a third direction DR3 crossing the first direction DR1 and the second direction DR2. Accordingly, front (or upper) and rear (or lower) surfaces of each member of the electronic apparatus 1000 may be defined with respect to the third direction DR3.

Figure 2:
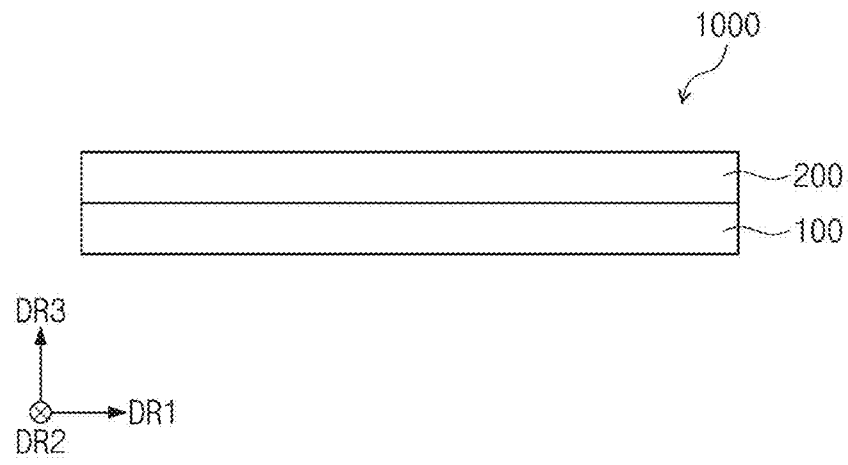
FIG. 2 is a cross-sectional view showing some components of an electronic apparatus according to an embodiment of the inventive concepts.

FIG. 2 is a cross-sectional view showing some components of the electronic apparatus 1000 according to an example embodiment.

In FIG. 2, the electronic apparatus 1000 may include a display panel 100 and a sensor 200.

The display panel 100 may have a configuration that substantially displays the image. The display panel 100 may be a light emitting type display panel. For example, the display panel 100 may be an organic light emitting display panel or a quantum dot light emitting display panel. As another way, the display panel 100 may be a light receiving type display panel. For example, the display panel 100 may be a liquid crystal display panel.

The sensor 200 may be disposed on the display panel 100. The sensor 200 may sense an external input applied from the outside. For example, the external input may be a user's input. The user input may include a variety of external inputs, such as a part of user's body, light, heat, pen, or pressure.

The sensor 200 may be formed on the display panel 100 through successive processes. As another way, the sensor 200 may be combined with the display panel 100 by an adhesive member. The adhesive member may include an ordinary adhesive. For example, the adhesive member may be a transparent adhesive member, such as a pressure sensitive adhesive (PSA) film, an optically clear adhesive (OCA) film, or an optically clear resin (OCR).

Although not shown in figures, the electronic apparatus 1000 may further include a window disposed on the sensor 200. The window may include an optically transparent insulating material, and the window may include glass or plastic. The window may have a single-layer or multi-layer structure.

Figure 3:
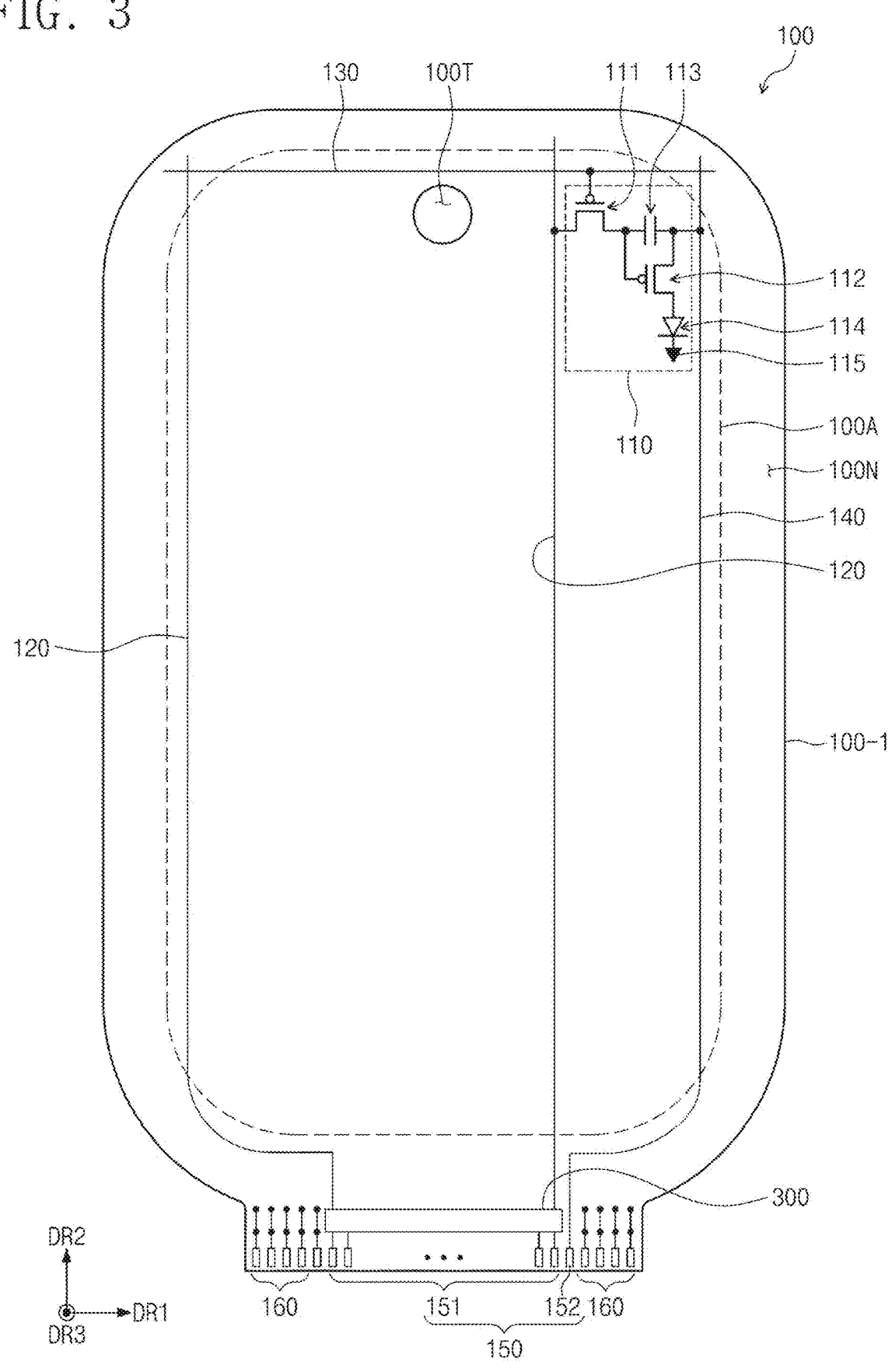
FIG. 3 is a plan view showing a display panel according to an embodiment of the inventive concepts.

FIG. 3 is a plan view showing the display panel 100 according to an example embodiment.

In FIG. 3, the display panel 100 may include an active area 100A and a peripheral area 100N, which are defined therein. The active area 100A may be activated in response to an electrical signal. For example, the active area 100A may display the image. The peripheral area 100N may surround the active area 100A. A driving circuit or a driving line, which are used to drive the active area 100A, may be disposed in the peripheral area 100N.

A transmission area 100T may be defined in the active area 100A of the display panel 100. The transmission area 100T may be surrounded by the active area 100A, however, it should not be limited thereto or thereby. For example, a portion of the transmission area 100T may make contact with the active area 100A, and the other portion of the transmission area 100T may make contact with the peripheral area 100N.

The transmission area 100T may have a relatively higher transmittance than the active area 100A. The transmission area 100T may be a space through which an external signal input into an electronic module or signals output from the electronic module are transmitted. For example, the electronic module may be a camera module.

The transmission area 100T may be defined by removing all or at least a portion of components of the display panel 100. The transmission area 100T may have one of a circular shape, an oval shape, a polygonal shape, and a polygonal shape having at least one curved side, however, the shape of the transmission area 100T should not be particularly limited.

The display panel 100 may include a base layer 100-1, a plurality of pixels 110, a plurality of signal lines 120, 130, and 140, a plurality of display pads 150, and a plurality of sensing pads 160.

The base layer 100-1 may include a synthetic resin film. The synthetic resin film may include a heat-curable resin. The base layer 100-1 may have a multi-layer structure. For instance, the base layer 100-1 may have a three-layer structure of a synthetic resin layer, an adhesive layer, and a synthetic resin layer. In particular, the synthetic resin layer may be a polyimide-based resin layer; however, the material for the synthetic resin layer should not be particularly limited. The synthetic resin layer may include at least one of an acrylic-based resin, a methacrylic-based resin, a polyiso-prene, a vinyl-based resin, an epoxy-based resin, a urethane-based resin, a cellulose-based resin, a siloxane-based resin, a polyamide-based resin, and a perylene-based resin. The base layer 100-1 may include a glass substrate or an organic/inorganic composite substrate.

The signal lines 120, 130, and 140 are connected to the pixels 110 to transmit the electrical signals to the pixels 110. In FIG. 3, the signal lines 120, 130, and 140 including a data line 120, a scan line 130, and a power line 140 are shown as a representative example, however, these are merely example. The signal lines 120, 130, and 140 may further include at least one of an initialization voltage line and a light emitting control line, however, the signals lines 120, 130, and 140 should not be limited to a particular embodiment.

The pixels 110 may be disposed in the active area 100A. In the present example embodiment, an equivalent circuit diagram of one pixel 110 is shown as a representative example.

The pixel 110 may include a first transistor 111, a second transistor 112, a capacitor 113, and a light emitting device 114. The first transistor 111 may be a switching device that controls an on-off of the pixel 110. The first transistor 111 may transmit or block a data signal applied thereto through the data line 120 in response to a scan signal applied thereto through the scan line 130.

The capacitor 113 may be connected to the first transistor 111 and the power line 140. The capacitor 113 may be charged with an electric charge by an amount corresponding to a difference between the data signal transmitted from the first transistor 111 and a first power signal applied to the power line 140.

The second transistor 112 may be connected to the first transistor 111, the capacitor 113, and the light emitting device 114. The second transistor 112 may control a driving current flowing through the light emitting device 114 in response to the amount of the electric charge charged in the capacitor 113. A turn-on time of the second transistor 112 may be determined in accordance with the amount of the electric charge charged in the capacitor 113. The second transistor 112 may provide the first power signal applied thereto through the power line 140 to the light emitting device 114.

The light emitting device 114 may generate a light or may control an amount of the light in response to electrical signals. For example, the light emitting device 114 may include an organic light emitting device, a quantum dot light emitting device, a micro-LED light emitting device, or a nano-LED light emitting device.

The light emitting device 114 may be connected to a power terminal 115 and may receive a power signal (hereinafter, referred to as a "second power signal" or a "ground voltage") different from the first power signal provided through the power line 140. The driving current corresponding to a difference between an electrical signal provided from the second transistor 112 and the second power signal flows through the light emitting device 114, and the light emitting device 114 may generate the light corresponding to the driving current.

Meanwhile, this is merely example, and the pixel 110 may include electronic elements having various configurations and arrangements, however, it should not be particularly limited. For example, the pixel 110 may have an equivalent circuit including seven transistors and one capacitor, and the equivalent circuit of the pixel 110 may be changed in various ways.

The display pads 150 may include a first pad 151 and a second pad 152. The first pad 151 may be provided in plural, and the first pads 151 may be respectively connected to data lines 120. The second pad 152 may be electrically connected to the power line 140. Although not shown in figures, the second pad 152 may be electrically connected to the power line 140 through a power pattern.

The display panel 100 may provide electrical signals applied thereto through the display pads 150 from the outside to the pixels 110. Meanwhile, the display pads 150 may further include pads to receive other electrical signals in addition to the first pad 151 and the second pad 152, however, the display pads 150 should not be limited thereto or thereby.

A driving chip 300 may be mounted on the peripheral area 100N of the display panel 100. The driving chip 300 may be a timing control circuit implemented in a chip form. In this case, the data lines 120 may be electrically connected to the first pads 151 through the driving chip 300, however, this is merely example, and the driving chip 300 may be mounted on a film separated from the display panel 100. In this case, the driving chip 300 may be electrically connected to the display pads 150 through the film.

The sensing pads 160 may be electrically connected to sensing electrodes of the sensor described later. Some sensing pads of the sensing pads 160 may be arranged to be spaced apart from the other sensing pads of the sensing pads 160 such that the display pads 150 are disposed between some sensing pads and the other sensing pads, however, these are merely example, and the arrangement relationship between the sensing pads 160 and the display pads 150 may be variously changed.

Figure 4:
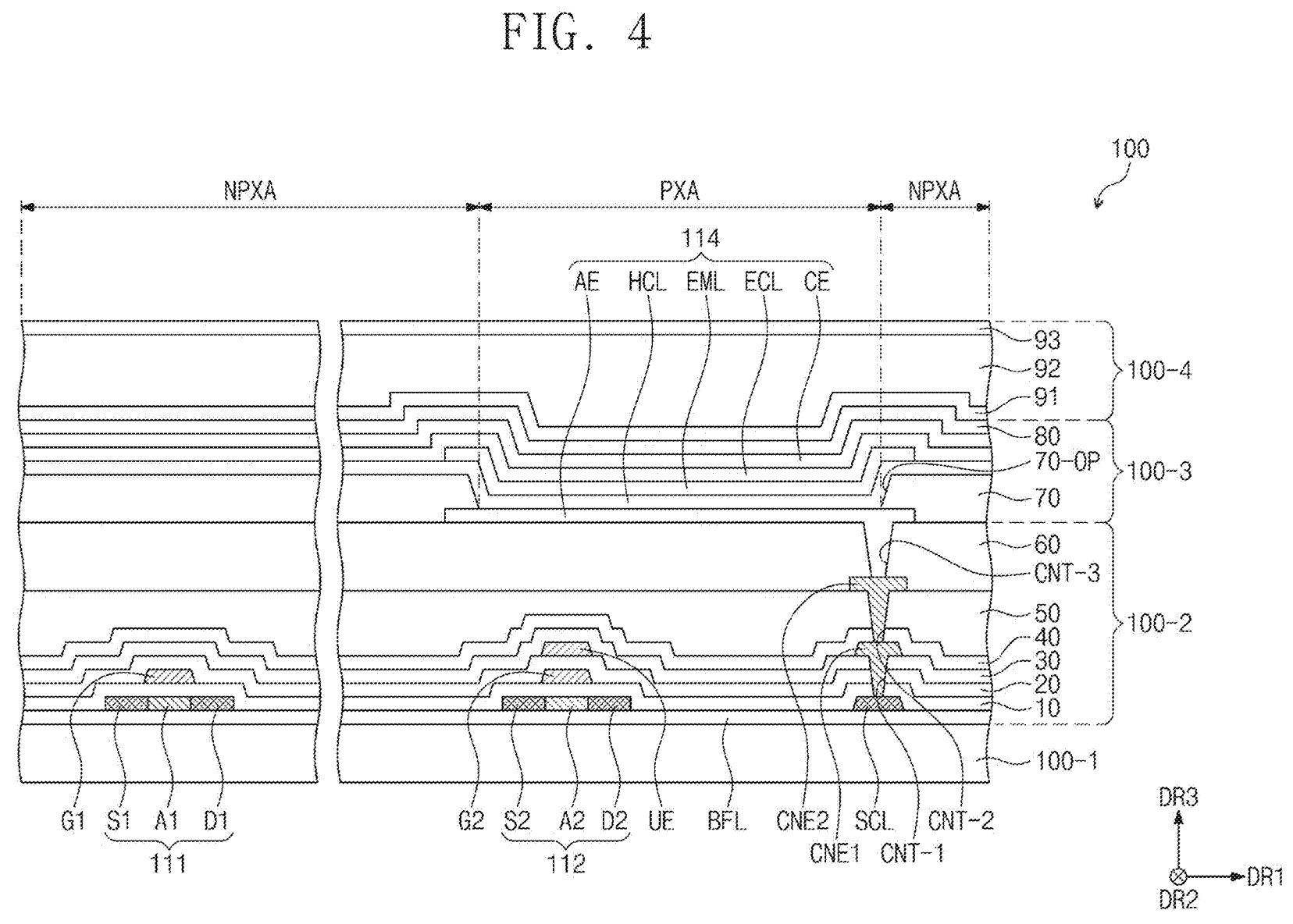

FIG. 4 is a cross-sectional view showing the display panel 100 according to an example embodiment.

Referring to FIG. 4, the display panel 100 may include a plurality of insulating layers, a semiconductor pattern, a conductive pattern, and a signal line. An insulating layer, a semiconductor layer, and a conductive layer may be formed by a coating or depositing process. Then, the insulating layer, the semiconductor layer, and the conductive layer may be selectively patterned by a photolithography process. The semiconductor pattern, the conductive pattern, and the signal line included in a circuit layer 100-2 and a display element layer 100-3 may be formed. Then, an encapsulation layer 100-4 that covers the display element layer 100-3 may be formed.

At least one inorganic layer may be formed on an upper surface of the base layer 100-1. The inorganic layer may include at least one of aluminum oxide, titanium oxide, silicon oxide, silicon oxynitride, zirconium oxide, and hafnium oxide. The inorganic layer may be formed in multiple layers. The inorganic layers may form a barrier layer and/or a buffer layer. In the present example embodiment, the display panel 100 may include a buffer layer BFL.

The buffer layer BFL may increase a coupling force between the base layer 100-1 and the semiconductor pattern. The buffer layer BFL may include a silicon oxide layer and a silicon nitride layer, and the silicon oxide layer and the silicon nitride layer may be alternately stacked with each other.

The semiconductor pattern may be disposed on the buffer layer BFL. The semiconductor pattern may include polysilicon, however, it should not be limited thereto or thereby. The semiconductor pattern may include amorphous silicon or metal oxide.

FIG. 4 shows only a portion of the semiconductor pattern, and the semiconductor pattern may be further disposed in other areas. The semiconductor pattern may be arranged with a specific rule over the pixels 110 (refer to FIG. 3). The semiconductor pattern may have different electrical properties depending on whether it is doped. The semiconductor pattern may include a doped region and a non-doped region. The doped region may be doped with an N-type dopant or a P-type dopant. A P-type transistor may include a doped region doped with the P-type dopant, and an N-type transistor may include a doped region doped with the N-type dopant.

The doped region may have a conductivity greater than that of the non-doped region and may substantially serve as an electrode or signal line. The non-doped region may substantially correspond to an active (or channel). In other words, a portion of the semiconductor pattern may be the active of the transistor, another portion of the semiconductor pattern may be a source or a drain of the transistor, and the other portion of the semiconductor pattern may be a connection electrode or a connection signal.

As shown in FIG. 4, a source S1, an active A1, and a drain D1 of the first transistor 111 may be formed from the semiconductor pattern, and a source S2, an active A2, and a drain D2 of the second transistor 112 may be formed from the semiconductor pattern. The sources S1 and S2 and the drains D1 and D2 may extend in opposite directions to each other from the actives A1 and A2. FIG. 4 shows a portion of a connection signal line SCL formed from the semiconductor pattern. Although not shown in figures, the connection signal line SCL may be connected to the drain D2 of the second transistor 112 in a plane.

A first insulating layer 10 may be disposed on the buffer layer BFL. The first insulating layer 10 may commonly overlap the pixels 110 (refer to FIG. 3) and may cover the semiconductor pattern. The first insulating layer 10 may be an inorganic layer and/or an organic layer and may have a single-layer or multi-layer structure. The first insulating layer 10 may include at least one of aluminum oxide, titanium oxide, silicon oxide, silicon oxynitride, zirconium oxide, and hafnium oxide. In the present example embodiment, the first insulating layer 10 may have a single-layer structure of a silicon oxide layer. Not only the first insulating layer 10, but also an insulating layer of the circuit layer 100-2 described later may be an inorganic layer and/or an organic layer and may have a single-layer or multi-layer structure. The inorganic layer may include at least one of the above-mentioned materials; however, the inorganic layer should not be limited thereto or thereby.

Gates G1 and G2 may be disposed on the first insulating layer 10. The gate G1 may correspond to a portion of metal pattern. The gates G1 and G2 may overlap the actives A1 and A2, respectively. The gates G1 and G2 may be used as a mask in a process of doping the semiconductor pattern.

A second insulating layer 20 may be disposed on the first insulating layer 10 and may cover the gates G1 and G2. The second insulating layer 20 may commonly overlap the pixels 110 (refer to FIG. 3). The second insulating layer 20 may be an inorganic layer and/or an organic layer and may have a single-layer or multi-layer structure. In the present example embodiment, the second insulating layer 20 may have a single-layer structure of silicon oxide.

An upper electrode UE may be disposed on the second insulating layer 20. The upper electrode UE may overlap the gate G2 of the second transistor 112. The upper electrode UE may be a portion of metal pattern. A portion of the gate G2 and the upper electrode UE overlapping the portion of the gate G2 may define the capacitor 113 (refer to FIG. 3). In an example embodiment, the upper electrode UE may be omitted.

A third insulating layer 30 may be disposed on the second insulating layer 20 and may cover the upper electrode UE. In the present example embodiment, the third insulating layer 30 may have a single-layer structure of silicon oxide.

A first connection electrode CNE1 may be disposed on the third insulating layer 30. The first connection electrode CNE1 may be connected to the connection signal line SCL through a contact hole CNT-1 defined through the first, second, and third insulating layers 10, 20, and 30.

A fourth insulating layer 40 may be disposed on the third insulating layer 30. The fourth insulating layer 40 may have a single-layer structure of a silicon oxide layer. A fifth insulating layer 50 may be disposed on the fourth insulating layer 40. The fifth insulating layer 50 may be an organic layer.

A second connection electrode CNE2 may be disposed on the fifth insulating layer 50. The second connection electrode CNE2 may be connected to the first connection electrode CNE1 through a contact hole CNT-2 defined through the fourth insulating layer 40 and the fifth insulating layer 50.

A sixth insulating layer 60 may be disposed on the fifth insulating layer 50 and may cover the second connection electrode CNE2. The sixth insulating layer 60 may be an organic layer.

The display element layer 100-3 including the light emitting device 114 may be disposed on the circuit layer 100-2. The light emitting device 114 may include a first electrode AE, a hole control layer HCL, a light emitting layer EML, an electron control layer ECL, and a second electrode CE.

The first electrode AE may be disposed on the sixth insulating layer 60. The first electrode AE may be connected to the second connection electrode CNE2 through a contact hole CNT-3 defined through the sixth insulating layer 60.

A pixel definition layer 70 may be disposed on the sixth insulating layer 60 and may cover a portion of the first electrode AE. An opening 70-OP may be defined through the pixel definition layer 70. At least a portion of the first electrode AE may be exposed through the opening 70-OP of the pixel definition layer 70

As shown in FIG. 4, the active area 100A (refer to FIG. 3) may include a pixel area PXA and a non-pixel area NPXA defined adjacent to the pixel area PXA. The non-pixel area NPXA may surround the pixel area PXA. In the present example embodiment, the pixel area PXA may be defined to correspond to the portion of the first electrode AE exposed through the opening 70-OP.

The hole control layer HCL may be disposed on the first electrode AE. The hole control layer HCL may be commonly disposed in the pixel area PXA and the non-pixel area NPXA. The hole control layer HCL may include a hole transport layer and may further include a hole injection layer.

The light emitting layer EML may be disposed on the hole control layer HCL. The light emitting layer EML may be disposed in an area corresponding to the opening 70-OP. That is, the light emitting layer EML may be formed in each of the pixels 110 (refer to FIG. 3) after being divided into portions, however, it should not be limited thereto or thereby. For instance, the light emitting layer EML may be commonly disposed over the pixel area PXA and the non-pixel area NPXA. When the light emitting layer EML is formed in each pixel after being divided into portions, the light emitting layers EML may emit lights having at least one color of blue, red, and green colors. When the light emitting layer EML is commonly disposed over the pixels 110 (refer to FIG. 3), the light emitting layer EML may provide a blue light or a white light.

The electron control layer ECL may be disposed on the light emitting layer EML. The electron control layer ECL may include an electron transport layer and may further include an electron injection layer. The hole control layer HCL and the electron control layer ECL may be commonly formed in the plural pixels using an open mask.

The second electrode CE may be disposed on the electron control layer ECL. The second electrode CE may have an integral shape and may be commonly disposed in the pixels 110 (refer to FIG. 3).

A capping layer 80 may be disposed on the second electrode CE and may make contact with the second electrode CE. The capping layer 80 may include an organic material. The capping layer 80 may protect the second electrode CE from the following process, for instance, a sputtering process, and may increase a light emitting efficiency of the light emitting device 114. The capping layer 80 may have a refractive index greater than that of a first inorganic layer 91 described later, however, it should not be limited thereto or thereby. In an example embodiment, the capping layer 80 may be omitted.

The encapsulation layer 100-4 may be disposed on the display element layer 100-3. The encapsulation layer 100-4 may include the first inorganic layer 91, an organic layer 92, and a second inorganic layer 93. The first inorganic layer 91 and the second inorganic layer 93 may protect the display element layer 100-3 from moisture/oxygen, and the organic layer 92 may protect the display element layer 100-3 from a foreign substance such as dust particles. The first inorganic layer 91 and the second inorganic layer 93 may include a silicon nitride layer, a silicon oxynitride layer, a silicon oxide layer, a titanium oxide layer, or an aluminum oxide layer. The organic layer 92 may include an acrylic-based organic layer, however, it should not be limited thereto or thereby.

In an example embodiment, an inorganic layer, for example, an LiF layer, may be further disposed between the capping layer 80 and the first inorganic layer 91. The LiF layer may increase the light emitting efficiency of the light emitting device 114.

Figure 5:
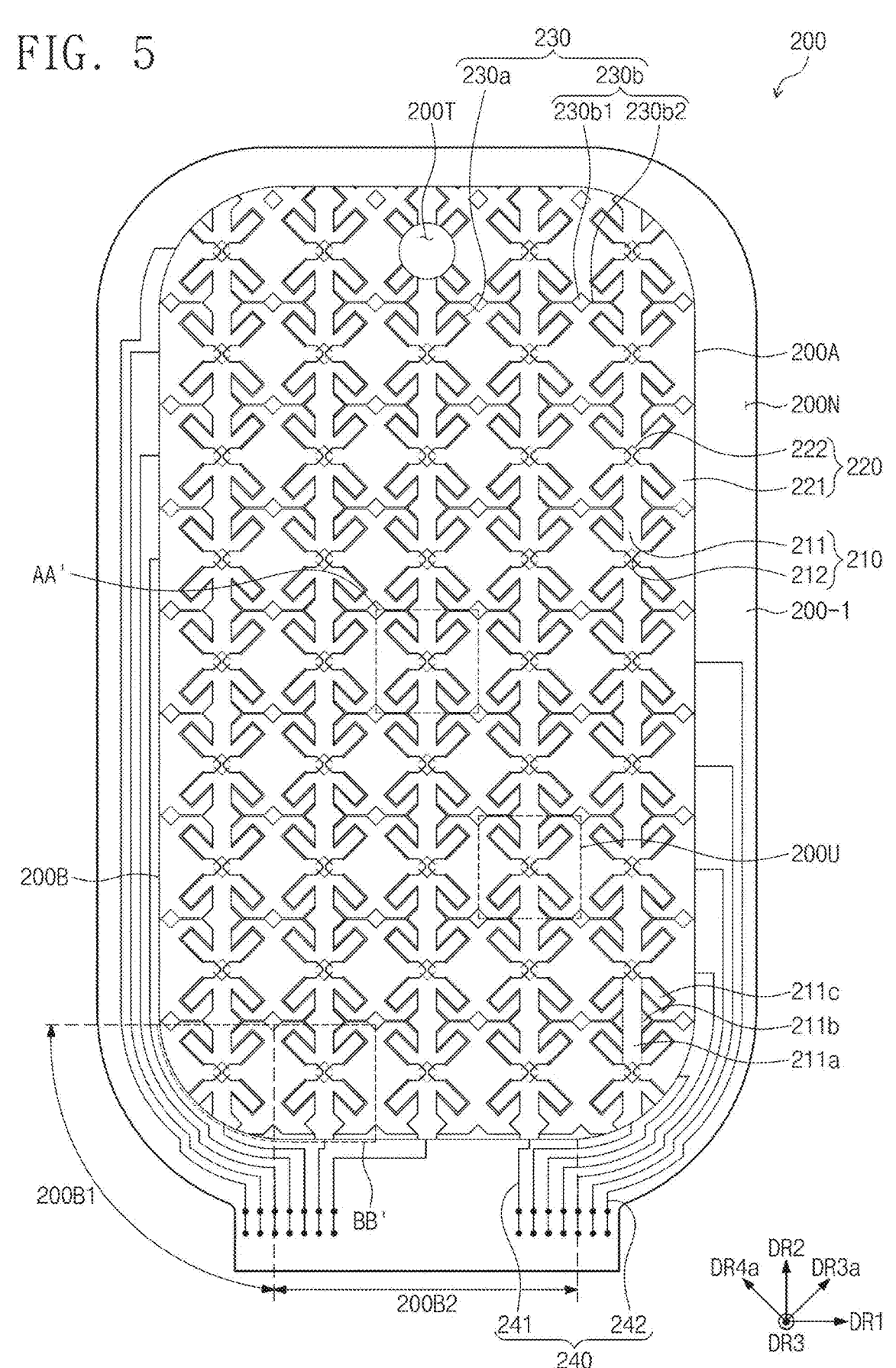
FIG. 5 is a plan view showing a sensor according to an embodiment of the inventive concepts.

FIG. 5 is a plan view showing the sensor 200 according to an example embodiment.

Referring to FIG. 5, the sensor 200 may include an active area 200A and a peripheral area 200N, which are defined therein. The active area 200A may be activated in response to an electrical signal. For example, the active area 200A may be an area in which an input is sensed. The peripheral area 200N may surround the active area 200A.

A boundary 200B may be defined between the active area 200A and the peripheral area 200N, and the boundary 200B may include a first boundary portion 200B1 and a second boundary portion 200B2. The first boundary portion 200B1 may be a portion of the boundary 200B having a curvature, and the second boundary portion 200B2 may be a portion of the boundary 200B extending in the first direction DR1.

A transmission area 200T may be defined in the active area 200A of the sensor 200. The transmission area 200T may overlap the transmission area 100T (refer to FIG. 3) of the display panel 100 (refer to FIG. 3) described above. The transmission area 200T may be defined by removing all or at least a portion of components of the sensor 200.

The sensor 200 may include a base insulating layer 200-1, first sensing electrodes 210, second sensing electrodes 220, patterns 230, and a line part 240. The first sensing electrodes 210, the second sensing electrodes 220, and the patterns 230 may be disposed in the active area 200A, and the line part 240 may be disposed in the peripheral area 200N. The line part 240 may be electrically connected to the sensing pads 160 (refer to FIG. 3) through contact holes.

The sensor 200 may obtain information about the external input based on a variation in capacitance between the first sensing electrodes 210 and the second sensing electrodes 220. The first sensing electrodes 210 may be arranged in the first direction DR1, and each of the first sensing electrodes 210 may extend in the second direction DR2. The first sensing electrodes 210 may include first sensing patterns 211 and first connection patterns 212. The first connection patterns 212 may electrically connect two first sensing patterns 211 adjacent to each other.

The second sensing electrodes 220 may extend in the first direction DR1 and may be arranged in the second direction DR2. The second sensing electrodes 220 may include second sensing patterns 221 and second connection patterns 222. The second connection patterns 222 may electrically connect two second sensing patterns 221 adjacent to each other. Two second sensing patterns 221 adjacent to each other may be connected to each other by the second connection patterns 222; however, they should not be limited thereto or thereby.

Each of the first sensing patterns 211 may include a first portion 211a, a second portion 211b, and a third portion 211c.

The first portion 211a may extend in the second direction DR2. One end of the first portion 211a may be connected to one first connection pattern 212, and the other end of the first portion 211a may be connected to another first connection pattern 212. The first portion 211a may be referred to as a trunk portion. Since the first connection patterns 212 and the first sensing patterns 211 have a single connected structure, the first connection patterns 212 may be defined as portions of the first portion 211a.

The second portion 211b may protrude from the first portion 211a to the first direction DR1. For example, the second portion 211b may protrude in a direction away from a center area of the first portion 211a. The second portion 211b may be referred to as a protrusion portion.

The third portion 211c may be provided in plural. The third portions 211c may extend in a first cross direction DR3a or a second cross direction DR4a from the first portion 211a. Some portions of the third portions 211c may extend in the first cross direction DR3a, and the other portions of the third portions 211c may extend in the second cross direction DR4a. The third portions 211c may be referred to as a "branch portions".

The first cross direction DR3a may be a direction crossing the first direction DR1 and the second direction DR2. For example, the first cross direction DR3a may be a direction between the first direction DR1 and the second direction DR2. The second cross direction DR4a may be a direction crossing the first cross direction DR3a. For example, the first cross direction DR3a and the second cross direction DR4a may be substantially perpendicular to each other.

Each of the second sensing patterns 221 may have a shape corresponding to a shape of the first sensing patterns 211 adjacent thereto. Each of the second sensing patterns 221 may surround at least two third portions 211c of each of the first sensing patterns 211 adjacent thereto.

Sensing lines 241 and 242 may include first sensing lines 241 and second sensing lines 242. The first sensing lines 241 may be electrically connected to the first sensing electrodes 210, respectively, and the second sensing lines 242 may be electrically connected to the second sensing electrodes 220, respectively. Some second sensing lines among the second sensing lines 242 may be respectively connected to left sides of some second sensing electrodes among the second sensing electrodes 220, and the other second sensing lines among the second sensing lines 242 may be respectively connected to right sides of the other second sensing electrodes 220 among the second sensing electrodes 220. However, the connection relationship between the first sensing lines 241 and the first sensing electrodes 210 and the connection relationship between the second sensing lines 242 and the second sensing electrodes 220 should not be limited to the embodiment shown in FIG. 5.

The patterns 230 may be spaced apart from the first sensing patterns 211 and the second sensing patterns 221. The patterns 230 may be formed through the same process as the first sensing patterns 211 and the second sensing patterns 221. Accordingly, the patterns 230 may include the same material as and may have the same stack structure as the first sensing patterns 211 and the second sensing patterns 221. The patterns 230 may be referred to as "dummy patterns", "auxiliary patterns", "additional patterns", "sub-patterns", or "boundary patterns".

The patterns 230 may include a first pattern 230a and a second pattern 230b. The first pattern 230a may be disposed between the first sensing patterns 211 and the second sensing patterns 221. The second pattern 230b may be disposed between the second sensing patterns 221. For example, the second pattern 230b may be disposed between two second sensing patterns 221 adjacent to each other in the second direction DR2, and the two second sensing patterns 221 may be spaced apart from each other by the second pattern 230b.

The second pattern 230b may include a first boundary pattern 230b1 and second boundary patterns 230b2. The first boundary pattern 230b1 may have a lozenge shape in a plane. The second boundary patterns 230b2 may be spaced apart from each other with the first boundary pattern 230b1 interposed therebetween. Each of the second boundary patterns 230b2 may extend in the first direction DR1. Each of the second boundary patterns 230b2 may be connected to the first boundary pattern 230b1 and the first pattern 230a.

As the first pattern 230a is disposed between the first sensing patterns 211 and the second sensing patterns 221 and the second pattern 230b is disposed between the second sensing patterns 221, a visibility of a boundary area between the first sensing patterns 211 and the second sensing patterns 221 and a boundary area between the second sensing patterns 221 may be reduced.

Some patterns among the patterns 230 may be floating electrodes that are not electrically connected to the first sensing patterns 211 and the second sensing patterns 221. As another way, some patterns among the patterns 230 may be grounded. The other patterns of the patterns 230 may be connected to the first sensing patterns 211 or the second sensing patterns 221 to improve a sensitivity of the sensor 200. Detailed descriptions thereof will be described later.

Figure 6:
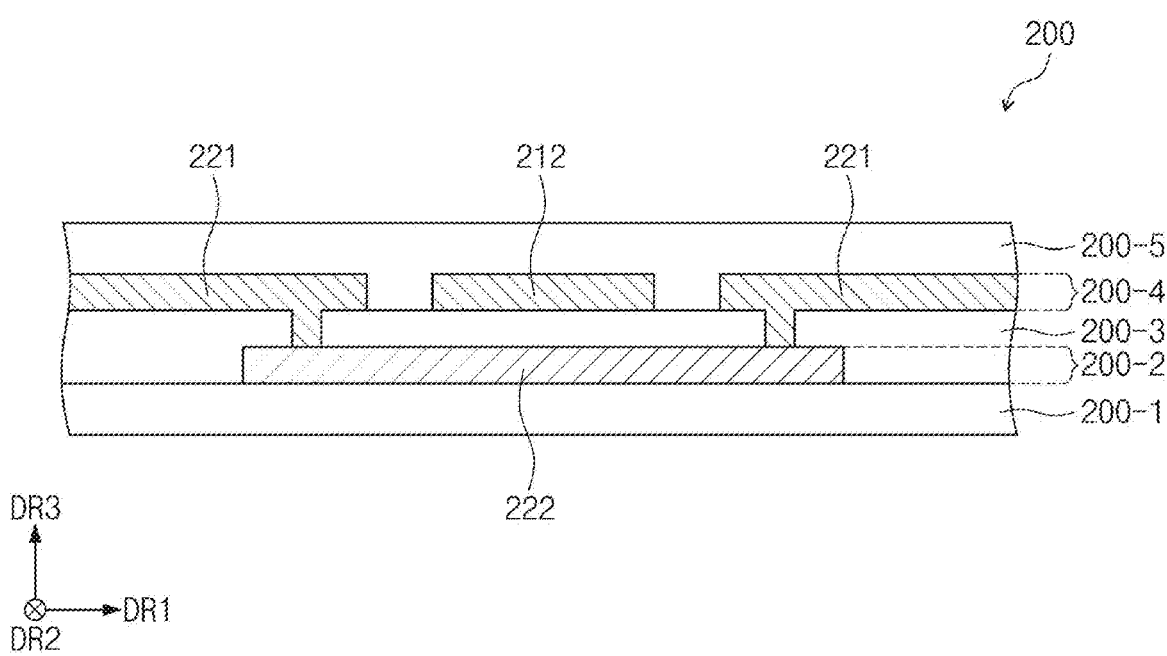
FIG. 6 is a cross-sectional view showing a sensor according to an embodiment of the inventive concepts.

FIG. 6 is a cross-sectional view showing the sensor according to an example embodiment.

In FIGS. 5 and 6, the sensor 200 may include the base insulating layer 200-1, a first conductive layer 200-2, a sensing insulating layer 200-3, a second conductive layer 200-4, and a cover insulating layer 200-5. The first conductive layer 200-2 may be disposed on the base insulating layer 200-1. The sensing insulating layer 200-3 may be disposed on the first conductive layer 200-2. The second conductive layer 200-4 may be disposed on the sensing insulating layer 200-3. The cover insulating layer 200-5 may be disposed on the second conductive layer 200-4.

The base insulating layer 200-1 may be an inorganic layer including one of silicon nitride, silicon oxynitride, and silicon oxide. As another way, the base insulating layer 200-1 may be an organic layer including an epoxy resin, an acrylic resin, or an imide-based resin. The base insulating layer 200-1 may have a single-layer structure or a stack structure in which layers are stacked in the third direction DR3.

The base insulating layer 200-1 may be formed directly on the display panel 100 (refer to FIG. 2). Alternately, the base insulating layer 200-1 may be a component of the display panel 100. As another way, the base insulating layer 200-1 may be formed on a separate base layer and then, the base layer may be coupled to the display panel 100 (refer to FIG. 2) by an adhesive member.

Each of the first conductive layer 200-2 and the second conductive layer 200-4 may have a single-layer structure or a stack structure in which layers are stacked in the third direction DR3. The conductive layer having the single-layer structure may include a metal layer or a transparent conductive layer. The metal layer may include molybdenum, silver, titanium, copper, aluminum, or alloys thereof. The transparent conductive layer may include transparent conductive oxide, such as indium tin oxide (ITO), indium zinc oxide (IZO), zinc oxide (ZnO), or indium zinc tin oxide (IZTO). The transparent conductive layer may include a conductive polymer such as PEDOT, a metal nanowire, or a graphene.

The conductive layer having the multi-layer structure may include metal layers. The metal layers may have a three-layer structure of titanium/aluminum/titanium. The conductive layer having the multi-layer structure may include at least one metal layer and at least one transparent conductive layer.

Each of the first conductive layer 200-2 and the second conductive layer 200-4 may include some of the first sensing patterns 211, the first connection patterns 212, the second sensing patterns 221, the second connection patterns 222, and the first and second sensing lines 241 and 242.

For example, the first conductive layer 200-2 may include the second connection patterns 222 and the first and second sensing lines 241 and 242. The second conductive layer 200-4 may include the first sensing patterns 211, the second sensing patterns 221, the first connection patterns 212, the first and second sensing lines 241 and 242, and the patterns 230.

The first and second sensing lines 241 and 242 of the first conductive layer 200-2 and the first and second sensing lines 241 and 242 of the second conductive layer 200-4 may be electrically connected to each other through contact holes defined through the sensing insulating layer 200-3. Accordingly, a resistance of the first and second sensing lines 241 and 242 may be reduced.

The first connection patterns 212 may be formed through the same process as the first sensing patterns 211. Therefore, the first connection patterns 212 and the first sensing patterns 211 may have the same material and the same stack structure. In addition, the first connection patterns 212 and the first sensing patterns 211 may have a single connected structure. The second connection patterns 222 may be disposed on a different layer from the second sensing patterns 221. Thus, the second sensing patterns 221 may be referred to as "bridge patterns".

At least one of the sensing insulating layer 200-3 and the cover insulating layer 200-5 may include an inorganic layer. The inorganic layer may include at least one of aluminum oxide, titanium oxide, silicon oxide, silicon oxynitride, zirconium oxide, and hafnium oxide.

At least one of the sensing insulating layer 200-3 and the cover insulating layer 200-5 may include an organic layer. The organic layer may include at least one of an acrylic-based resin, a methacrylic-based resin, a polyisoprene, a vinyl-based resin, an epoxy-based resin, a urethane-based resin, a cellulose-based resin, a siloxane-based resin, a polyamide-based resin, and a perylene-based resin.

Figure 7A:
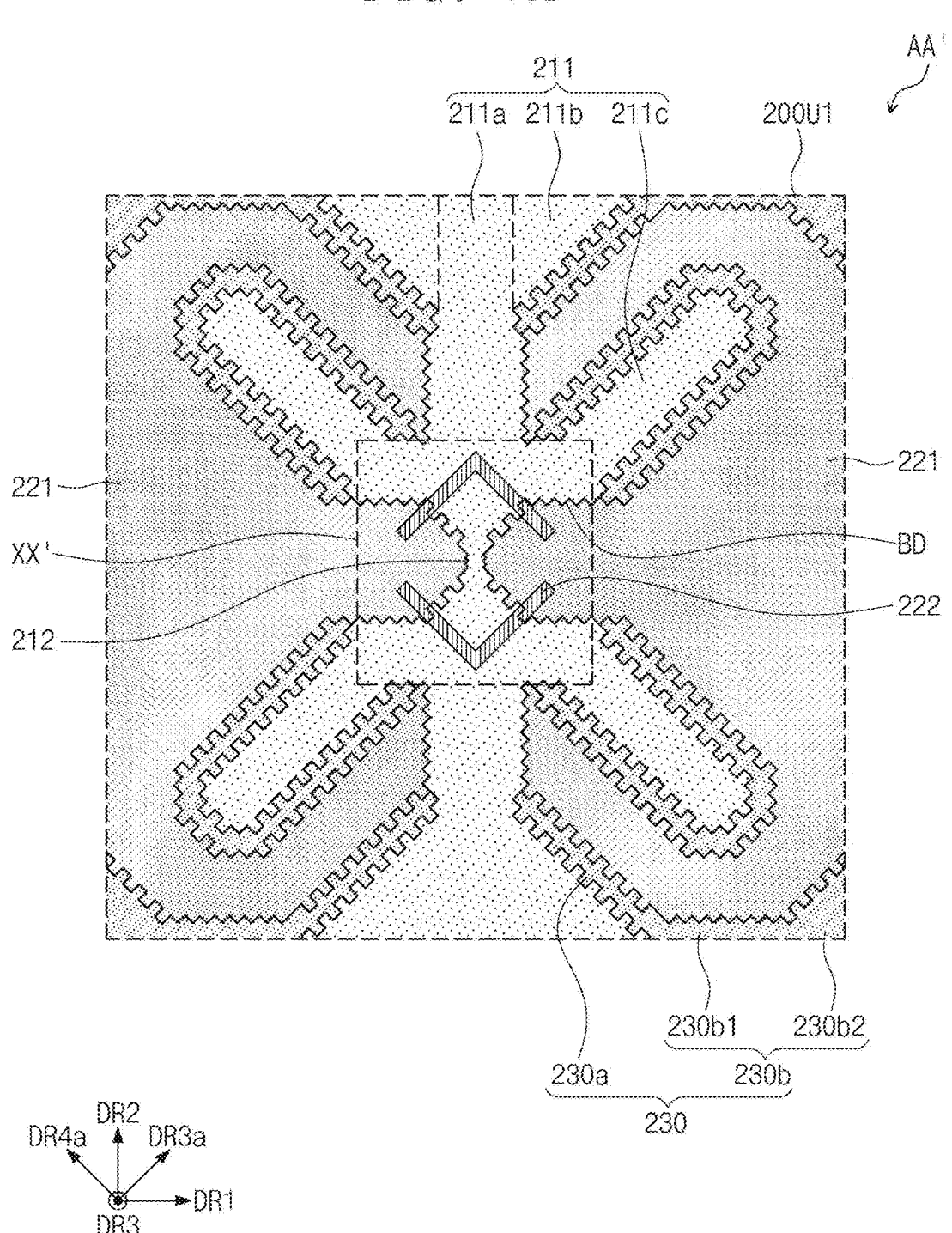
FIG. 7A is an enlarged plan view showing an area AA' of FIG. 5.
Figure 7B:
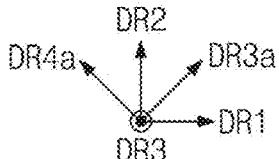
FIG. 7B is an enlarged plan view showing an area XX' of FIG. 7A.

FIG. 7A is an enlarged plan view showing an area AA' of FIG. 5. FIG. 7B is an enlarged plan view showing an area XX' of FIG. 7A.

In FIGS. 7A and 7B, each of the first sensing patterns 211, the second sensing patterns 221, and the patterns 230 may have a mesh structure (or a lattice structure). Boundaries BD between the first sensing patterns 211, the second sensing patterns 221, and the patterns 230 may be defined by removing portions of the mesh structure. In FIG. 7A, the boundaries BD are indicated by solid lines to clearly show the boundaries BD. The removed portions of the mesh structures shown in FIG. 7B may correspond to the boundaries BD. In addition, disconnection portions CTP defined by removing portions of the mesh structures may be further provided to prevent the boundaries from being viewed.

In FIGS. 5, 7A, and 7B, the sensor 200 may include a plurality of sensing units 200U. The sensing units 200U may be disposed in the active area 200A. Each of the sensing units 200U may include a portion of each of the two first sensing patterns 211, a portion of each of the two second sensing patterns 221, one first connection pattern 212, the second connection patterns 222 crossing the one first connection pattern 212, and the patterns 230.

Figure 8:
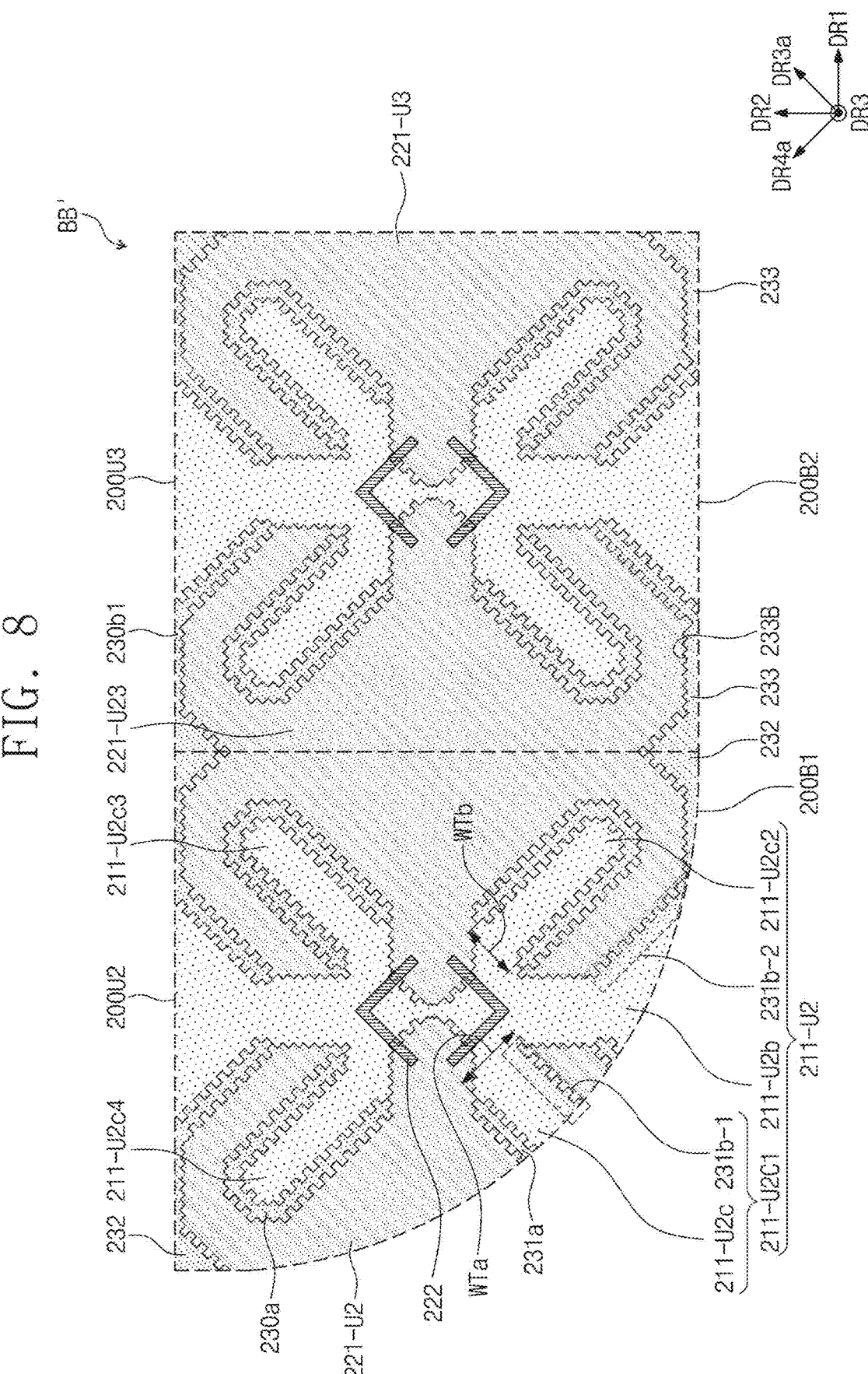
FIG. 8 is an enlarged plan view showing an area BB' of FIG. 5.

The sensing units 200U may include a first sensing unit 200U1 (refer to FIG. 7A), a second sensing unit 200U2 (refer to FIG. 8), and a third sensing unit 200U3 (refer to FIG. 8).

The first sensing unit 200U1 may be one of the sensing units 200U spaced apart from the boundary 200B. The first sensing unit 200U1 may be referred to as a "reference sensing unit". The third portions 211c (or "branch portions") in the first sensing unit 200U1 may extend in a direction away from the second connection patterns 222 (or "bridge patterns"). Four third portions 211c may be disposed in the first sensing unit 200U1. Two third portions 211c may extend in the first cross direction DR3a, and the other two third portions 211c may extend in the second cross direction DR4a.

FIG. 8 is an enlarged plan view showing an area BB' of FIG. 5.

In FIGS. 5, 7A, and 8, the second sensing unit 200U2 may be one of the sensing units 200U in contact with the first boundary portion 200B1, and the third sensing unit 200U3 may be one of the sensing units 200U in contact with the second boundary portion 200B2. The second sensing unit 200U2 may be referred to as an "outer sensing unit".

An area of the first sensing unit 200U1, an area of the second sensing unit 200U2, and an area of the third sensing unit 200U3 may be different from each other. For example, the area of the second sensing unit 200U2 may be smaller than the area of the first sensing unit 200U1 (or "reference sensing unit"), and the area of the third sensing unit 200U3 may be greater than the area of the first sensing unit 200U1. In this case, the first, second, and third sensing units 200U1, 200U2, and 200U3 may have different mutual capacitances from each other. The mutual capacitance may be a capacitance that varies depending on an input by an input member, for example, a finger. According to one or more example embodiments, the mutual capacitance may be controlled by adjusting the connection relationship of the patterns in the second sensing unit 200U2 and the third sensing unit 200U3. Accordingly, the sensitivity of the sensor 200 may be uniform.

The second sensing unit 200U2 may include a first sensing pattern 211-U2, a second sensing pattern 221-U2, and patterns 231a, 231b-1, 231b-2, and 232 adjacent to the first boundary portion 200B1.

The area of the second sensing unit 200U2 may be smaller than the area of the first sensing unit 200U1. Accordingly, at least a portion of the patterns 231a, 231b-1, 231b-2, and 232 in the second sensing unit 200U2 may be electrically connected to the first sensing pattern 211 or the second sensing pattern 221 to increase the mutual capacitance of the second sensing unit 200U2. That is, when compared with the first sensing unit 200U1, a pattern connected to the sensing pattern may be disposed at a place where the floating pattern should be located.

The patterns 231a, 231b-1, 231b-2, and 232 of the second sensing unit 200U2 in contact with the first boundary portion 200B1 may be referred to as "outer patterns 231a, 231b-1, 231b-2, and 232". At least one of the outer patterns 231a, 231b-1, 231b-2, and 232 may be electrically connected to the first sensing pattern 211-U2.

The outer patterns 231a, 231b-1, 231b-2, and 232 may include first outer patterns 231a, 231b-1, and 231b-2 disposed between the first sensing pattern 211-U2 and the second sensing pattern 221-U2 and between the first sensing pattern 211-U2 and a second sensing pattern 221-U23 and a second outer pattern 232 spaced apart from the first sensing pattern 211-U2 with one of the second sensing patterns 221-U2 and 221-U23 interposed therebetween.

At least some of the first outer patterns 231a, 231b-1, and 231b-2 may be electrically connected to the first sensing pattern 211-U2. Accordingly, the mutual capacitance of the second sensing unit 200U2 may increase compared with the mutual capacitance before some of the first outer patterns 231a, 231b-1, and 231b-2 are connected to the first sensing pattern 211-U2.

The second sensing unit 200U2 may include four third connection portions 211-U2c1, 211-U2c2, 211-U2c3, and 211-U2c4 extending from the first connection patterns 212. The third connection portions 211-U2c1, 211-U2c2, 211-U2c3, and 211-U2c4 may be referred to as "branch portions". The branch portions 211-U2c1, 211-U2c2, 211-U2c3, and 211-U2c4 may include a first branch portion 211-U2cl, a second branch portion 211-U2c2, a third branch portion 211-U2c3, and a fourth branch portion 211-U2c4.

Each of the first branch portion 211-U2cl and the third branch portion 211-U2c3 may extend in the first cross direction DR3a, and each of the second branch portion 211-U2c2 and the fourth branch portion 211-U2c4 may extend in the second cross direction DR4a. The first branch portion 211-U2cl may be in contact with the first boundary portion 200B1. Each of the second branch portion 211-U2c2, the third branch portion 211-U2c3, and the fourth branch portion 211-U2c4 may be spaced apart from the first boundary portion 200B1.

The first branch portion 211-U2cl may include a third portion 211-U2c and the first outer pattern 231b-1. The third portion 211-U2c may correspond to the third portion 211c of the first sensing unit 200U1, and the first outer pattern 231b-1 may correspond to a floating pattern.

Since the first branch portion 211-U2cl further includes the first outer pattern 231b-1, a maximum width WTa of the first branch portion 211-U2cl may be greater than a maximum width WTb of each of the second branch portion 211-U2c2, the third branch portion 211-U2c3, and the fourth branch portion 211-U2c4. In addition, a first outer pattern 231b-2 may be electrically connected to a second portion 211-U2b. As a result, although the area of the second sensing unit 200U2 is smaller than the area of the first sensing unit 200U1, the reduced mutual capacitance of the second sensing unit 200U2 may be compensated by increasing the maximum width WTa of the first branch portion 211-U2cl and electrically connecting the first outer pattern 231b-2 to the second portion 211-U2b.

Since the first outer patterns 231b-1 and 231b-2 are electrically connected to the first sensing pattern 211-U2 in the second sensing unit 200U2, the first outer patterns 231b-1 and 231b-2 may be referred to as "auxiliary patterns". The first outer patterns 231b-1 and 231b-2 may substantially serve as the first sensing pattern 211-U2. Accordingly, the mutual capacitance of the second sensing unit 200U2, which is reduced due to a difference in area between the second sensing unit 200U2 and the first sensing unit 200U1, may be compensated by the first outer patterns 231b-1 and 231b-2.

The third sensing unit 200U3 may further include a boundary pattern 233. The boundary pattern 233 may be disposed adjacent to the second boundary portion 200B2. The boundary pattern 233 may be disposed between the second sensing pattern 221-U23 and the line part 240. Due to the boundary pattern 233, a parasitic capacitance generated between the second sensing pattern 221-U23 and the first sensing lines 241 and a parasitic capacitance generated between the second sensing pattern 221-U3 and the first sensing lines 241 may be reduced.

A boundary 233B between the boundary pattern 233 and the second sensing pattern 221-U23 may correspond to the shape of the boundary between the first boundary pattern 230b1 and the second sensing pattern 221-U23. For example, the boundary 233B may have a zigzag shape.

The area of the third sensing unit 200U3 may be greater than the area of the first sensing unit 200U1. The mutual capacitance of the third sensing unit 200U3 may be greater than the mutual capacitance of the first sensing unit 200U1. According to an example embodiment, as the boundary pattern 233 is provided, the mutual capacitance of the third sensing unit 200U3 may be reduced. Therefore, a difference between the mutual capacitance of the third sensing unit 200U3 and the mutual capacitance of the first sensing unit 200U1 may be reduced.

According to an example embodiment, due to the change in the shape of the sensing unit, the reduced mutual capacitance may increase, and the increased mutual capacitance may be reduced. Thus, the uniform sensitivity may be provided in the active area 200A.

Figure 9:
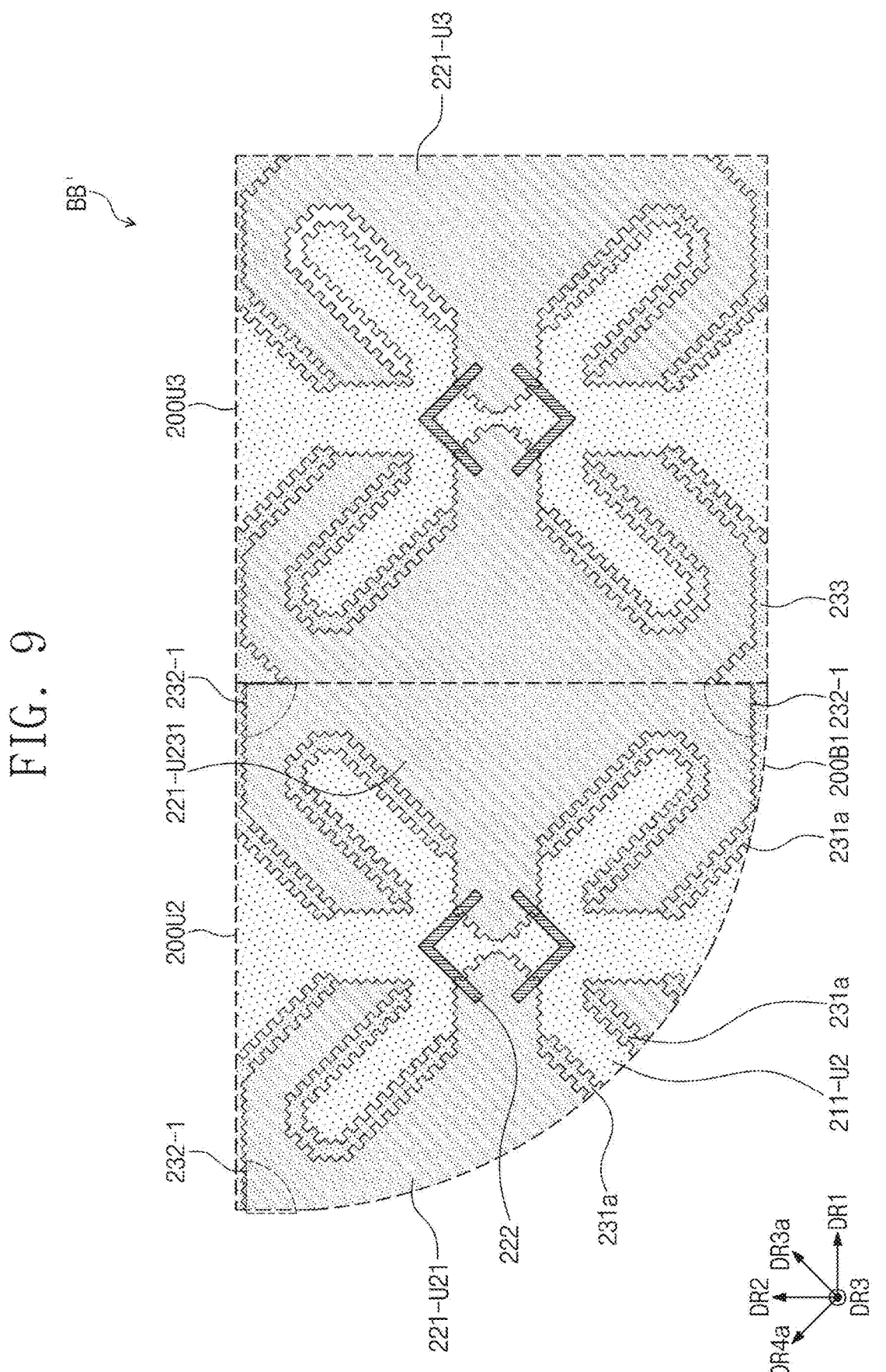
FIG. 9 is an enlarged plan view showing an area corresponding to the area BB' of FIG. 5 according to an embodiment of the inventive concepts.

FIG. 9 is an enlarged plan view showing an area corresponding to the area BB' of FIG. 5 according to an example embodiment. In FIG. 9, different features from those of FIG. 8 will be described in detail, and the detailed description of the same features as those of FIG. 8 will be omitted.

In FIGS. 5, 7A, and 9, the area of the second sensing unit 200U2 may be smaller than the area of the first sensing unit 200U1. Accordingly, at least some of patterns 231a and 232-1 of the second sensing unit 200U2 may be electrically connected to the first sensing pattern 211 or the second sensing pattern 221 to increase the mutual capacitance of the second sensing unit 200U2. Therefore, when compared with the first sensing unit 200U1, a pattern connected to the sensing pattern may be disposed at a place where the floating pattern should be located.

The patterns 231*a* and 232-1 of the second sensing unit 200U2 in contact with the first boundary portion 200B1 may be referred to as "outer patterns 231*a* and 232-1". At least one of the outer patterns 231*a* and 232-1 may be electrically connected to second sensing patterns 221-U21 and 221-U231.

The outer patterns 231*a* and 232-1 may include first outer patterns 231*a* disposed between the first sensing pattern 211-U2 and the second sensing pattern 221-U21 and between the first sensing pattern 211-U2 and the second sensing pattern 221-U231 and second outer patterns 232-1 spaced apart from the first sensing pattern 211-U2 with one of the second sensing patterns 221-U21 and 221-U231 interposed therebetween.

In the present example embodiment, the second outer patterns 232-1 may be electrically connected to the second sensing patterns 221-U21 and 221-U231. Therefore, the mutual capacitance of the second sensing unit 200U2 may increase compared with the mutual capacitance before the second outer patterns 232-1 are connected to the second sensing patterns 221-U21 and 221-U231.

Since the second outer patterns 232-1 are electrically connected to the second sensing patterns 221-U21 and 221-U231, the second outer patterns 232-1 may be referred to as "auxiliary patterns".

Figure 10:
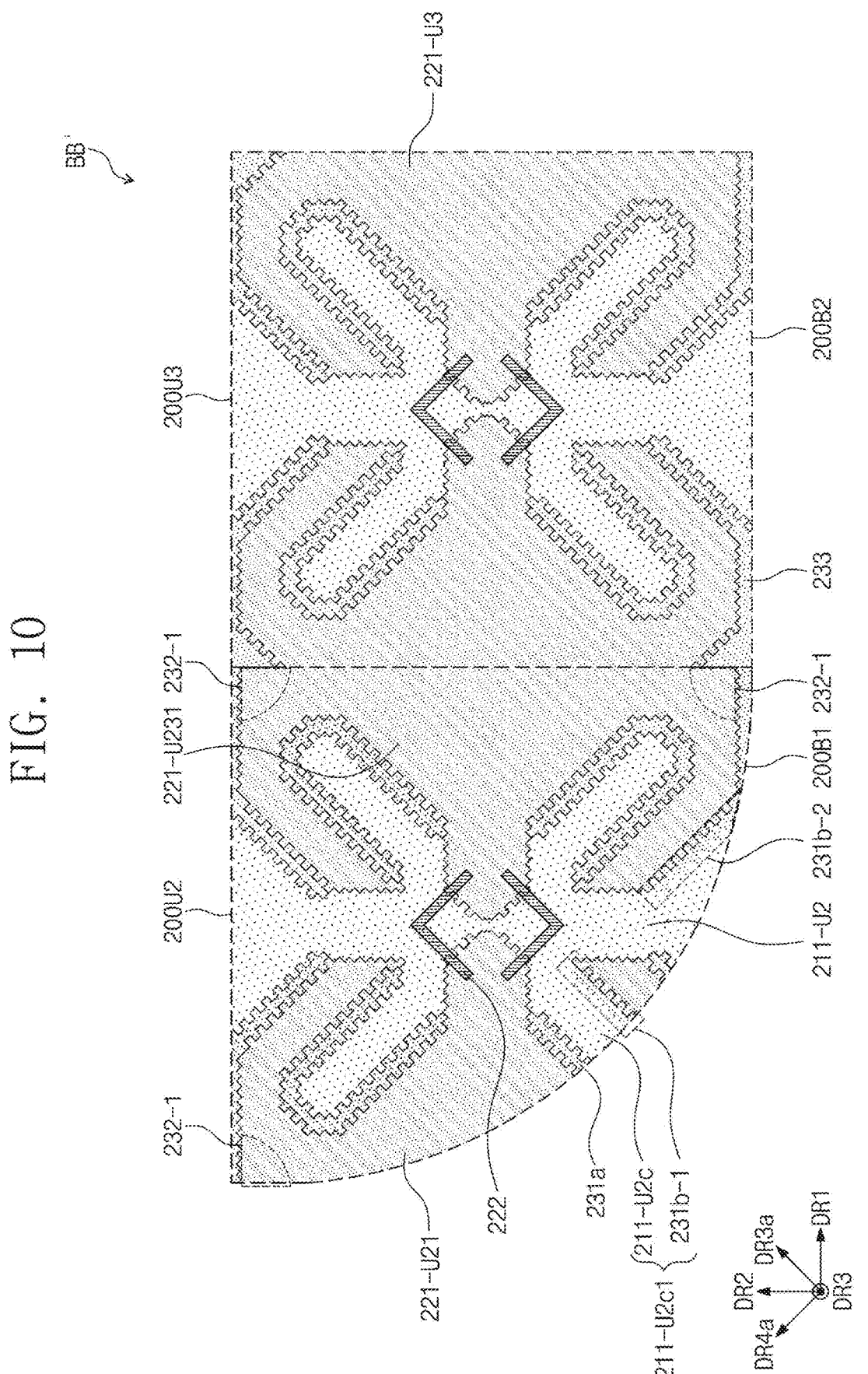
FIG. 10 is an enlarged plan view showing an area corresponding to the area BB' of FIG. 5 according to an embodiment of the inventive concepts.

FIG. 10 is an enlarged plan view showing an area corresponding to the area BB' of FIG. 5 according to an example embodiment. In FIG. 10, different features from those of FIG. 8 will be described in detail, and the detailed description of the same features as those of FIG. 8 will be omitted.

In FIGS. 5 and 10, the first outer patterns 231*b*-1 and 231*b*-2 of the second sensing unit 200U2 may be connected to the first sensing pattern 211-U2, and the second outer patterns 232-1 may be electrically connected to the second sensing patterns 221-U21 and 221-U231.

Since the first outer patterns 231*b*-1 and 231*b*-2 are electrically connected to the first sensing pattern 211-U2, the first outer patterns 231*b*-1 and 231*b*-2 may be referred to as "first auxiliary sensing patterns". Since the second outer patterns 232-1 are electrically connected to the second sensing patterns 221-U21 and 221-U231, the second outer patterns 232-1 may be referred to as "second auxiliary sensing patterns".

The mutual capacitance of the second sensing unit 200U2 may increase compared with the mutual capacitance before the first outer patterns 231*b*-1 and 231*b*-2 are connected to the first sensing pattern 211-U2 and before the second outer patterns 232-1 are connected to the second sensing patterns 221-U21 and 221-U231.

Figure 11:
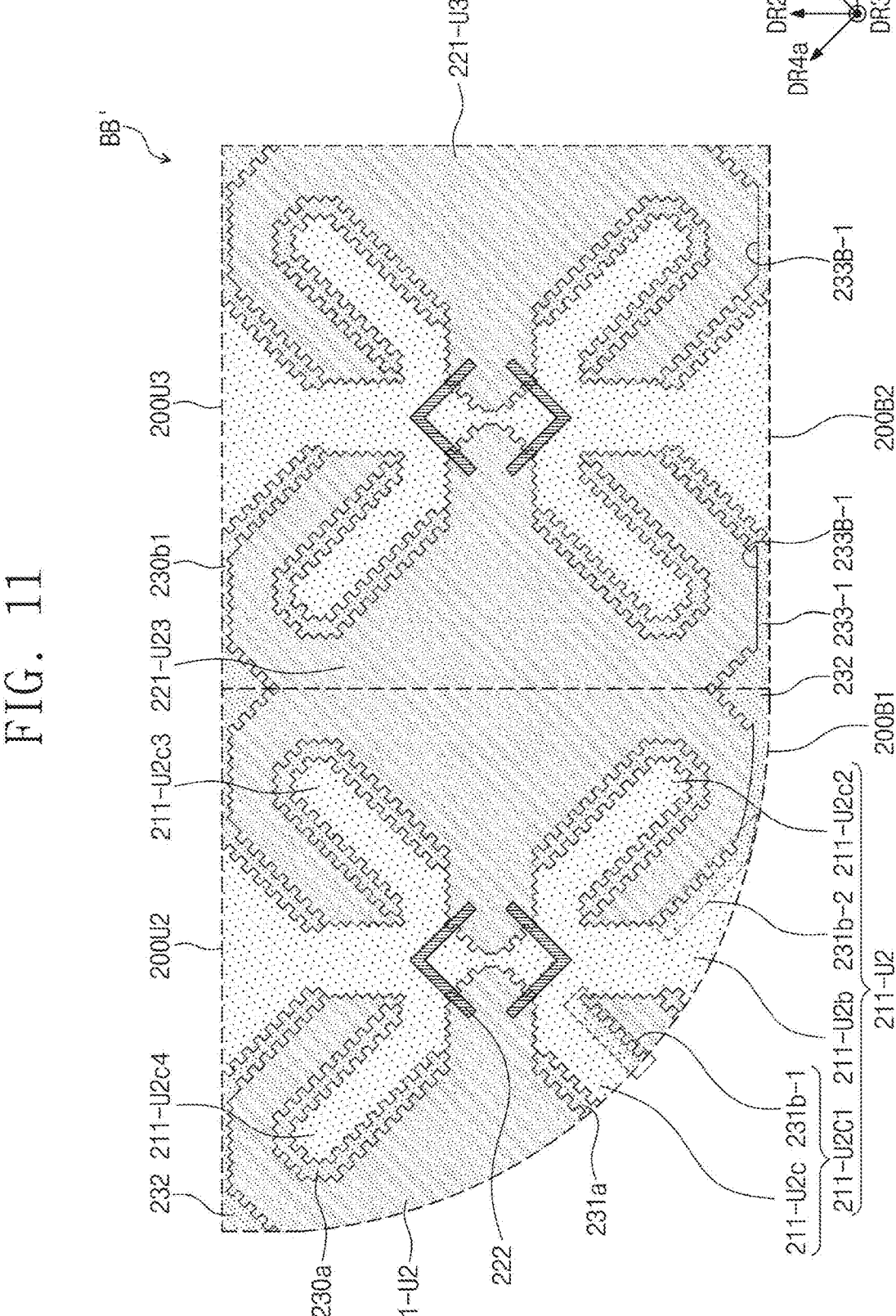
FIG. 11 is an enlarged plan view showing an area corresponding to the area BB' of FIG. 5 according to an embodiment of the inventive concepts.

FIG. 11 is an enlarged plan view showing an area corresponding to the area BB' of FIG. 5 according to an example embodiment. In FIG. 11, different features from those of FIG. 8 will be described in detail, and the detailed description of the same features as those of FIG. 8 will be omitted.

In FIGS. 5 and 11, the third sensing unit 200U3 may further include a boundary pattern 233-1. The boundary pattern 233-1 may be disposed adjacent to the second boundary portion 200B2. The boundary pattern 233-1 may be disposed between the second sensing pattern 221-U23 and the line part 240.

A boundary 233B-1 between the boundary pattern 233-1 and the second sensing pattern 221-U23 may have a straight-line shape extending in a predetermined direction, for example, the first direction DR1. As another way, the boundary 233B-1 may extend substantially parallel to the boundary 200B. Accordingly, a distance between the second sensing pattern 221-U23 and the line part 240 may be obtained by a predetermined interval or more. Therefore, when compared with FIG. 8, a parasitic capacitance generated between the second sensing pattern 221-U23 and the first sensing lines 241 and between the second sensing pattern 221-U3 and the first sensing lines 241 may be more reduced.

Figure 12:
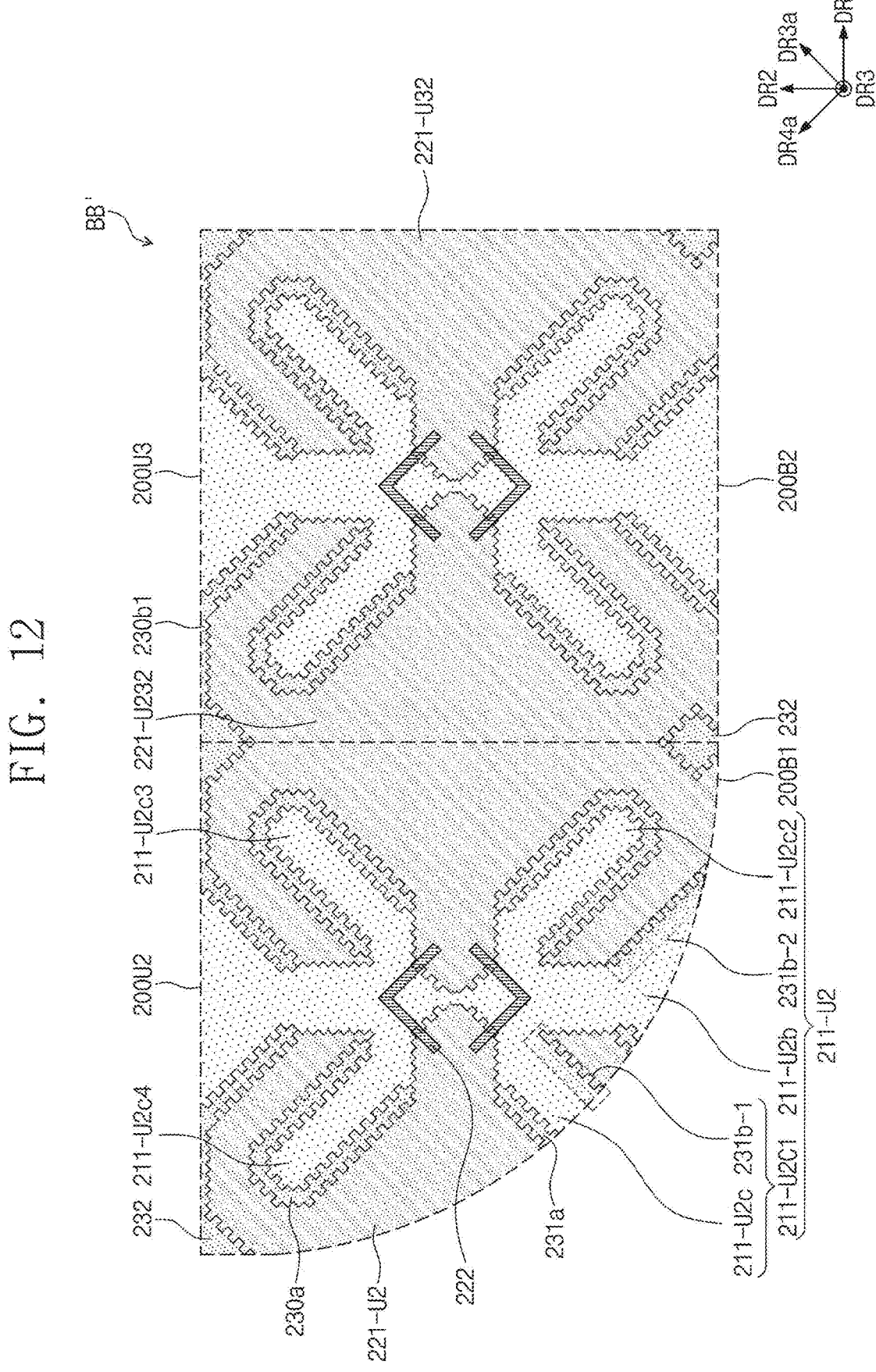
FIG. 12 is an enlarged plan view showing an area corresponding to the area BB' of FIG. 5 according to an embodiment of the inventive concepts.

FIG. 12 is an enlarged plan view showing an area corresponding to the area BB' of FIG. 5 according to an example embodiment. In FIG. 12, different features from those of FIG. 8 will be described in detail, and the detailed description of the same features as those of FIG. 8 will be omitted.

In FIGS. 5 and 12, the boundary pattern 233 (refer to FIG. 8) may not be provided to each of the second sensing unit 200U2 and the third sensing unit 200U3. Accordingly, second sensing patterns 221-U232 and 221-U32 may be in contact with the first boundary portion 200B1 and the second boundary portion 200B2.

Figure 13:
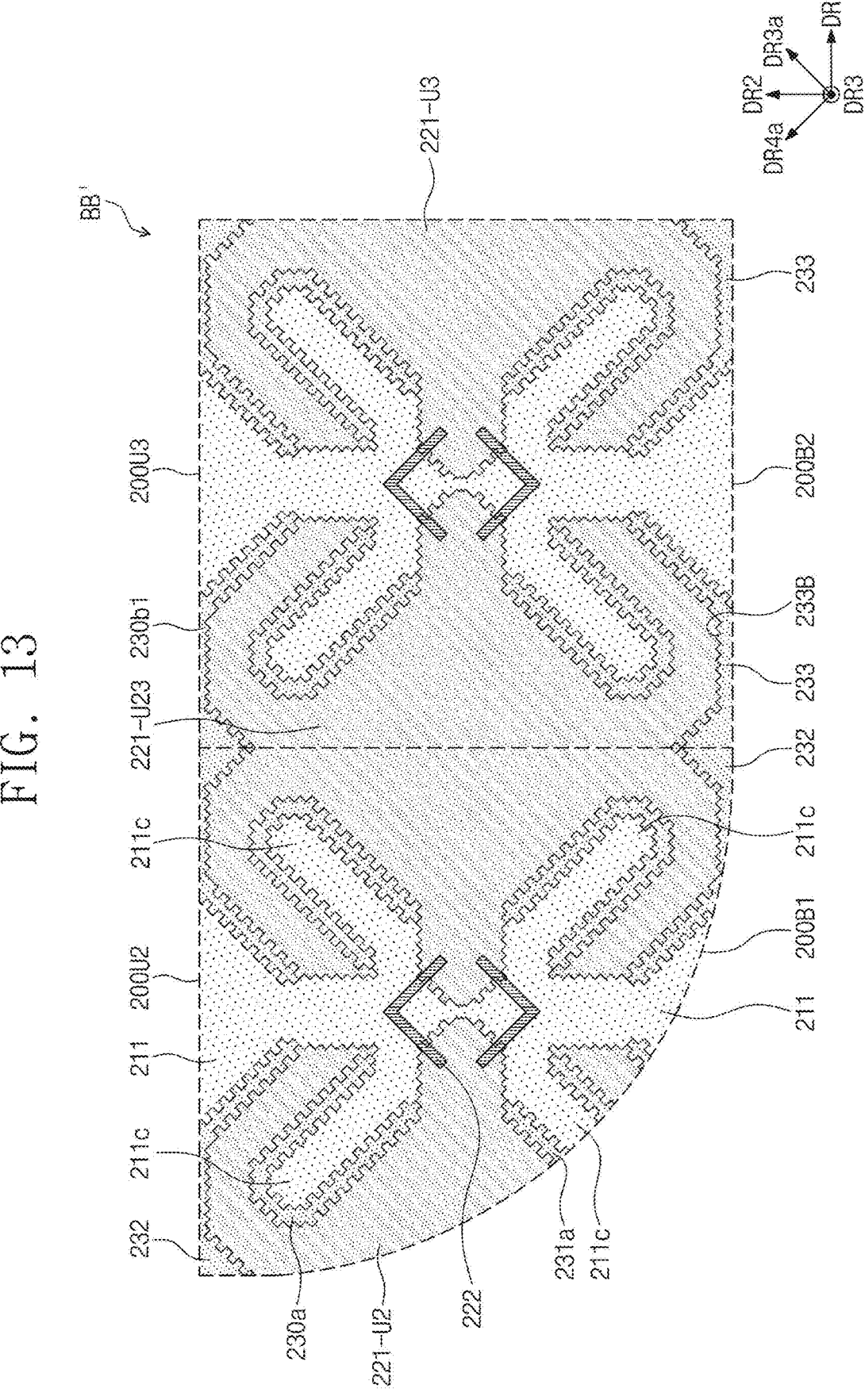
FIG. 13 is an enlarged plan view showing some areas of a sensor according to an embodiment of the inventive concepts.

FIG. 13 is an enlarged plan view showing some areas of a sensor according to an example embodiment. In FIG. 13, different features from those of FIG. 8 will be described in detail, and the detailed description of the same features as those of FIG. 8 will be omitted.

In FIGS. 5 and 13, a shape of the first sensing pattern 211 of the second sensing unit 200U2 may correspond to a shape of the first sensing pattern 211 of the first sensing unit 200U1 (refer to FIG. 7A). Accordingly, widths of the branch portions 211*c* of the second sensing unit 200U2 may be the same as each other.

The third sensing unit 200U3 may further include a boundary pattern 233. The boundary pattern 233 may be disposed adjacent to the second boundary portion 200B2. The boundary pattern 233 may be disposed between the second sensing pattern 221-U23 and the line part 240 (refer to FIG. 5).

Figure 14:
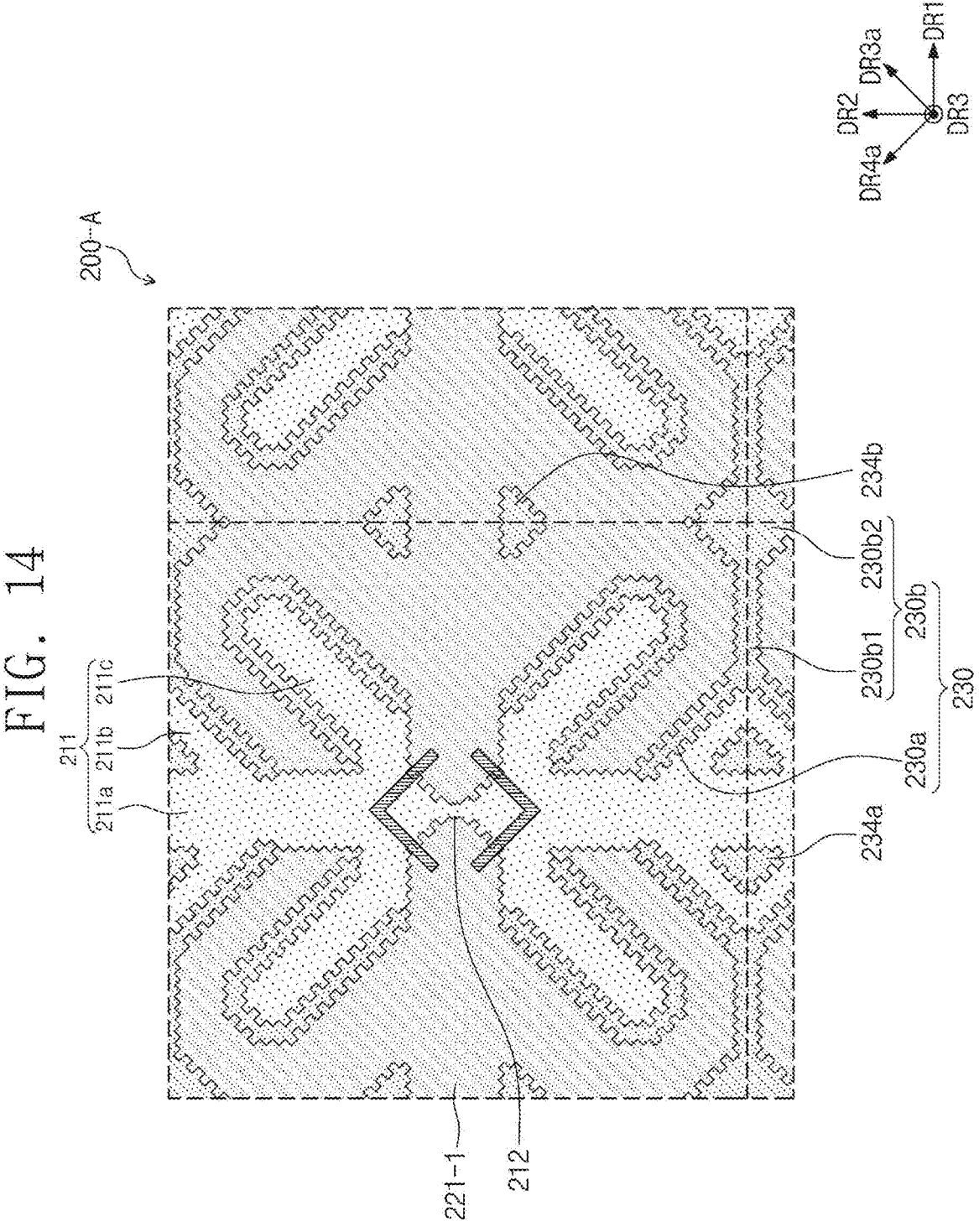
FIG. 14 is an enlarged plan view showing some areas of a sensor according to an embodiment of the inventive concepts.

FIG. 14 is an enlarged plan view showing some areas of a sensor 200-A according to an example embodiment.

In FIG. 14, a sensor 200-A may further include patterns 234*a* and 234*b* when compared with FIG. 7A. The patterns 234*a* and 234*b* may include a first additional pattern 234*a* defined in the first sensing pattern 211 and a second additional pattern 234*b* defined in a second sensing pattern 221-1.

The first additional pattern 234*a* may be surrounded by the first sensing pattern 211, and the second additional pattern 234*b* may be surrounded by the second sensing pattern 221-1. The first additional pattern 234*a* and the second additional pattern 234*b* may be floating electrodes that are not electrically connected to the first sensing pattern 211 and the second sensing pattern 221-1. As another way, the first additional pattern 234*a* and the second additional pattern 234*b* may be grounded. As another way, one of the first additional pattern 234*a* and the second additional pattern 234*b* may be electrically connected to the first sensing pattern 211 or the second sensing pattern 221-1.

Although certain example embodiments and implementations have been described herein, other embodiments and modifications will be apparent from this description. Accordingly, the inventive concepts are not limited to such embodiments, but rather to the broader scope of the appended claims and various obvious modifications and equivalent arrangements as would be apparent to a person of ordinary skill in the art.

What is claimed is:

1. An electronic apparatus comprising:
a display panel; and
a sensor on the display panel, the sensor comprising first sensing electrodes comprising branch portions, and second sensing electrodes,
wherein a first region in which the first sensing electrodes and the second sensing electrodes are located, a second region adjacent to the first region, and a boundary between the first region and the second region are defined in the sensor,
wherein the boundary comprises a boundary portion having a curvature,
wherein the branch portions comprise a first branch portion adjacent to the boundary portion, and a second branch portion spaced from the boundary portion, and
wherein a width of the first branch portion is greater than a width of the second branch portion.

2. The electronic apparatus of claim 1, wherein the first sensing electrodes comprise a first-first sensing electrode comprising the first branch portion, and a second-first sensing electrode comprising the second branch portion,
wherein the first-first sensing electrode and the second-first sensing electrode are spaced from each other in a first direction, and
wherein each of the first-first sensing electrode and the second-first sensing electrode extends in a second direction intersecting the first direction.

3. The electronic apparatus of claim 2, wherein the first branch portion and the second branch portion extend in a direction intersecting the first direction and the second direction.

4. The electronic apparatus of claim 2, wherein the second sensing electrodes comprise a second sensing electrode crossing the first-first sensing electrode and the second-first sensing electrode, and
wherein a minimum distance between the second sensing electrode and the first branch portion is smaller than a minimum distance between the second sensing electrode and the second branch portion.

5. The electronic apparatus of claim 2, wherein the second sensing electrodes comprise a second sensing electrode crossing the first-first sensing electrode and the second-first sensing electrode, and
wherein the sensor further comprises a dummy pattern located between the second branch portion and the second-first sensing electrode.

6. The electronic apparatus of claim 2, wherein the sensor further comprises a dummy pattern facing the second branch portion.

7. The electronic apparatus of claim 6, wherein each of the second sensing electrodes includes sensing patterns, and connection patterns electrically connected to the sensing patterns, and
the first sensing electrodes, the sensing patterns, and the dummy pattern are arranged at a same layer.

8. An electronic apparatus comprising:
a display panel; and
a sensor on the display panel, the sensor comprising first sensing electrodes and second sensing electrodes,
wherein a first region in which the first sensing electrodes and the second sensing electrodes are located, a second region adjacent to the first region, and a boundary between the first region and the second region are defined in the sensor,
wherein the boundary comprises a boundary portion having a curvature,
wherein the first sensing electrodes comprise a first-first sensing electrode in contact with the boundary portion and including first branch portions, and a second-first sensing electrode spaced from the boundary portion and including second branch portions,
wherein the second sensing electrodes comprise one second sensing electrode in contact with the boundary portion and crossing the first-first sensing electrode and the second-first sensing electrode, and
wherein a minimum distance between the one second sensing electrode and the first branch portions is smaller than a minimum distance between the one second sensing electrode and the second branch portions.

9. The electronic apparatus of claim 8, wherein the sensor further comprises a dummy pattern located between the one second sensing electrode and the second-first sensing electrode.

10. The electronic apparatus of claim 9, wherein the dummy pattern is a floating electrode insulated from the second-first sensing electrode and the one second sensing electrode.

11. The electronic apparatus of claim 8, wherein the first branch portions and the one second sensing electrode directly face each other.

12. The electronic apparatus of claim 8, wherein the first-first sensing electrode and the second-first sensing electrode are spaced from each other in a first direction,
wherein each of the first-first sensing electrode and the second-first sensing electrode extends in a second direction intersecting the first direction, and
wherein each of the first branch portions and the second branch portions extends in a direction intersecting the first direction and the second direction.

13. The electronic apparatus of claim 12, wherein the one second sensing electrode comprises sensing patterns spaced from each other along the first direction, and a connection pattern electrically connected to the sensing patterns.

14. An electronic apparatus comprising:
a sensor comprising a first sensing electrode comprising branch portions, second sensing electrodes crossing the first sensing electrode, and a dummy pattern,
wherein a first region in which the first sensing electrode and the second sensing electrodes are located, a second region adjacent to the first region, and a boundary between the first region and the second region are defined in the sensor,
wherein the boundary comprises a boundary portion having a curvature,
wherein the branch portions comprise a first branch portion adjacent to the boundary portion, and a second branch portion spaced from the boundary portion, and
wherein the first branch portion directly faces one second sensing electrode from among the second sensing electrodes, and the dummy pattern is located between the second branch portion and another second sensing electrode from among the second sensing electrodes.

15. The electronic apparatus of claim 14, wherein a width of the first branch portion is greater than a width of the second branch portion.

16. The electronic apparatus of claim 14, wherein each of the second sensing electrodes extends in a first direction, wherein the first sensing electrode extends in a second direction intersecting the first direction, wherein the second sensing electrodes are arranged along the second direction, and wherein the first branch portion and the second branch portion are spaced from each other in the second direction.

17. The electronic apparatus of claim 16, wherein the first branch portion and the second branch portion extend in a direction intersecting the first direction and the second direction.

\* \* \* \* \*